(12) United States Patent
Amagai

(10) Patent No.: US 8,699,087 B2
(45) Date of Patent: *Apr. 15, 2014

(54) IMAGE GENERATING APPARATUS, IMAGE PROCESSING APPARATUS, IMAGE FORMING APPARATUS, AND RECORDING MEDIUM

(75) Inventor: Takayuki Amagai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 827 days.

This patent is subject to a terminal disclaimer.

(21) Appl. No.: 12/657,963

(22) Filed: Jan. 29, 2010

(65) Prior Publication Data

US 2010/0195834 A1    Aug. 5, 2010

(30) Foreign Application Priority Data

Jan. 30, 2009 (JP) ................................. 2009-020746

(51) Int. Cl.
*H04N 1/40* (2006.01)
*H04N 1/405* (2006.01)

(52) U.S. Cl.
USPC ........................................ 358/3.28; 358/468

(58) Field of Classification Search
USPC ......... 358/3.28, 1.9, 2.1, 521, 1.15, 1.18, 468
See application file for complete search history.

(56) References Cited

U.S. PATENT DOCUMENTS

| | | | | |
|---|---|---|---|---|
| 7,057,775 | B2 * | 6/2006 | Kurita et al. | 358/3.28 |
| 7,796,776 | B2 * | 9/2010 | Inatomi et al. | 382/100 |
| 2003/0090690 | A1 * | 5/2003 | Katayama et al. | 358/1.9 |
| 2006/0097062 | A1 | 5/2006 | Cheong et al. | |
| 2007/0177824 | A1 | 8/2007 | Cattrone et al. | |
| 2010/0321739 | A1 | 12/2010 | Amagai | |
| 2011/0002012 | A1 * | 1/2011 | Amagai | 358/3.28 |

FOREIGN PATENT DOCUMENTS

| | | |
|---|---|---|
| JP | 2003-91697 | 3/2003 |
| JP | 2008-016934 | 1/2008 |
| WO | WO 2008/003964 A2 | 1/2008 |

OTHER PUBLICATIONS

K. Ito et al. "Paper Document Security" Fuji Xerox technical report No. 15 2005 p. 32-41; URL:http://www.fujixerox.co.jp/company/tr/15/download/pdf/t_4.pdf.

Ronald L. Rivest "The MD5 Message—Digest Algorithm" (R. Rivest, MIT Laboratory for Computer Science and RSA Data Security, Inc.).

Non-Final Office Action issued on Mar. 1, 2013 in related U.S. Appl. No. 12/803,238.

Notice of Allowance issued on Aug. 27, 2013 in related U.S. Appl. 12/803,238.

* cited by examiner

*Primary Examiner* — Vincent Rudolph
*Assistant Examiner* — Stephen M Brinich
(74) *Attorney, Agent, or Firm* — Edwards Wildman Palmer LLP; David G. Conlin; David A. Tucker

(57) ABSTRACT

Additional image data of an additional image, which is based on first data and second data concerning security of obtained data, is added to image data that is based on the obtained data, and an image based on the image data to which the additional image data is added is outputted onto a recording medium, for example. Furthermore, when the additional image data is added to image data of the image obtained from the recording medium, the first data and second data are separated from the additional image data, and reference is made to these pieces of data to perform subsequent processing of the image data.

15 Claims, 21 Drawing Sheets

QR CODE DATA 1 (BLACK)
MICRO GRADATION DATA 0

| 0 | 10 | 20 | 30 | 30 | 30 | 30 | 30 |
|---|----|----|----|----|----|----|----|
| 10 | 10 | 20 | 30 | 20 | 20 | 20 | 30 |
| 20 | 20 | 20 | 30 | 10 | 10 | 20 | 30 |
| 30 | 30 | 30 | 30 | 0 | 10 | 20 | 30 |
| 30 | 20 | 10 | 0 | 30 | 30 | 30 | 30 |
| 30 | 20 | 10 | 10 | 30 | 20 | 20 | 20 |
| 30 | 20 | 20 | 20 | 30 | 20 | 10 | 10 |
| 30 | 30 | 30 | 30 | 30 | 20 | 10 | 0 |

QR CODE DATA 0 (WHITE)
MICRO GRADATION DATA 0

| 225 | 235 | 245 | 255 | 255 | 255 | 255 | 255 |
|-----|-----|-----|-----|-----|-----|-----|-----|
| 235 | 235 | 245 | 255 | 245 | 245 | 245 | 255 |
| 245 | 245 | 245 | 255 | 235 | 235 | 245 | 255 |
| 255 | 255 | 255 | 255 | 225 | 235 | 245 | 255 |
| 255 | 245 | 235 | 225 | 255 | 255 | 255 | 255 |
| 255 | 245 | 235 | 235 | 255 | 245 | 245 | 245 |
| 255 | 245 | 245 | 245 | 255 | 245 | 235 | 235 |
| 255 | 255 | 255 | 255 | 255 | 245 | 235 | 225 |

QR CODE DATA 1 (BLACK)
MICRO GRADATION DATA 1

| 30 | 30 | 30 | 30 | 30 | 20 | 10 | 0 |
|----|----|----|----|----|----|----|----|
| 30 | 20 | 20 | 20 | 30 | 20 | 10 | 10 |
| 30 | 20 | 10 | 10 | 30 | 20 | 20 | 20 |
| 30 | 20 | 10 | 0 | 30 | 30 | 30 | 30 |
| 30 | 30 | 30 | 30 | 0 | 10 | 20 | 30 |
| 20 | 20 | 20 | 30 | 10 | 10 | 20 | 30 |
| 10 | 10 | 20 | 30 | 20 | 20 | 20 | 30 |
| 0 | 10 | 20 | 30 | 30 | 30 | 30 | 30 |

QR CODE DATA 0 (WHITE)
MICRO GRADATION DATA 1

| 255 | 255 | 255 | 255 | 255 | 245 | 235 | 225 |
|-----|-----|-----|-----|-----|-----|-----|-----|
| 255 | 245 | 245 | 245 | 255 | 245 | 235 | 235 |
| 255 | 245 | 235 | 235 | 255 | 245 | 245 | 245 |
| 255 | 245 | 235 | 225 | 255 | 255 | 255 | 255 |
| 255 | 255 | 255 | 255 | 225 | 235 | 245 | 255 |
| 245 | 245 | 245 | 255 | 235 | 235 | 245 | 255 |
| 235 | 235 | 245 | 255 | 245 | 245 | 245 | 255 |
| 225 | 235 | 245 | 255 | 255 | 255 | 255 | 255 |

IMAGE GENERATING APPARATUS, IMAGE PROCESSING APPARATUS, IMAGE FORMING APPARATUS, AND RECORDING MEDIUM

CROSS-REFERENCE TO RELATED APPLICATIONS (US only) This Nonprovisional application claims priority under 35 U.S.C. §119(a) on Patent Application No. 2009-20746 filed in Japan on Jan. 30. 2009, the entire contents of which are hereby incorporated by reference.

BACKGROUND

1. Technical Field

The present invention relates to: an image generating apparatus for generating image data; an image processing apparatus for processing image data concerning a document; an image reading apparatus including the image processing apparatus; an image forming apparatus including the image processing apparatus; an image generating method for generating image data; an image processing method for processing image data concerning a document; and a recording medium recording a computer program for executing processing of image data.

2. Description of Related Art

While the computerization of information advances, the widespread use of printers, copiers and multifunction printers is concurrently accelerated, and the passing of document data via a document including a sheet-like recording medium (hereinafter simply called a "document") is also increasing more than ever.

On the other hand, two-dimensional codes are becoming more and more widespread as methods for adding additional data to printed matters. For example, as for a QR code that is one of two-dimensional codes, mobile phones possessed by many people nowadays are often provided with the functions of reading QR codes. Further, the function of creating the above-mentioned QR codes is provided as one of functions in some mobile phones, but also exists as computer software.

There have also been developed data embedding techniques in which a region where a code should be added is not required like the case of adding a QR code onto a document, the degradation in image quality is not so clearly perceived by human eyes, and additional data is embedded while taking the layout of a document into consideration. As one example of such techniques, micro gradation is disclosed in "Paper Document Security" written by Kensuke Ito and four others ([online] Fuji Xerox Technical Report, [searched on Nov. 29. 2008], Internet <URL: http://www.fujixerox.co.jp/company/tr/15/download/pdf/t_4.pdf>). The micro gradation is a technique in which a design of a document is used as a ground, and additional data is embedded in the design, thus presenting the binarized additional data with a given pattern having a density difference in the design.

SUMMARY

However, in the case of a document provided by printing document data on a recording medium, it is hard to find the answer to the question "who created the document?" after the document has been released from the creator of said document, and it might be difficult to confirm the contents of the document. Moreover, a third party who is not intended by the creator of the document can easily handle operations such as copying and reading of the document (document data), thus causing the problem of lack of security.

Further, a QR code has a predetermined limit for the amount of data to be contained. For example, in the case of a QR code specification "Version 40 (177×177)", the containable "Chinese characters/Japanese syllabaries" amount to 1817 characters at the maximum. Furthermore, in the case of printing a QR code on a recording medium, the area occupied by the QR code is desirably small in consideration of factors such as the layout of the document and the appearance thereof, but a predetermined size is required in accordance with the resolution of a reading apparatus. For example, when reading is performed using a camera function of a mobile phone, a QR code having cells, each having sides of about 1 mm, is used.

The micro gradation, disclosed in "Paper Document Security" written by Kensuke Ito and four others ([online] Fuji Xerox Technical Report, [searched on Nov. 29. 2008], Internet <URL: http://www.fujixerox.co.jp/company/tr/15/download/pdf/t_4.pdf), has difficulty in predicting a design (or a set of dots) serving as a ground, and thus has difficulty in reading the pattern embedded in the design when the design contains a high frequency component, thereby causing a problem that a complicated process for avoiding this difficulty is required. It should be noted that since the degradation in image quality of the pictorial design is not so clearly perceived by human eyes, there also arises a problem that it is impossible to know "whether or not information is embedded" or "where the information is embedded" when reading is performed using a camera function of a mobile phone, for example.

The present invention is made in view of the above-described circumstances and its object is to provide an image generating apparatus, an image processing apparatus, an image reading apparatus, an image forming apparatus, an image generating method, an image processing method and a recording medium, in which additional image data of an additional image, based on first data and second data concerning security of obtained data, is added to image data that is based on the obtained data, and an image based on the image data to which the additional image data is added is outputted onto a recording medium, for example; furthermore, when the additional image data is added to image data of an image obtained from a recording medium, the first data and second data are separated from the additional image data, and reference is made to these pieces of data to perform subsequent processing of the image data, thus allowing more data concerning security to be visually added to a limited space without being influenced by a high frequency component such as a fine line pattern.

An image generating apparatus according to the present invention is an image generating apparatus for generating image data based on obtained data, comprising: a code generation section for generating, based on first data concerning security of the obtained data, image data indicative of a two-dimensional code having a plurality of cells; an encryption section for encrypting second data concerning security of the obtained data;

a pattern generation section for generating, based on the encrypted second data, pattern image data in which a gradation pattern is presented in the cells of the two-dimensional code; and an addition section for adding, to the image data, additional image data which is based on the generated image data of the two-dimensional code and the generated pattern image data.

In the present invention, when obtained data is obtained, the code generation section generates image data indicative of the two-dimensional code based on the first data, and the pattern generation section generates the pattern image data based on the second data encrypted by the encryption section. The addition section adds the additional image data, which is based on the generated image data indicative of the two-dimensional code and the generated pattern image data, to the image data.

An image generating apparatus according to the present invention is characterized by further comprising a hash value generation section for applying a hash function to the image data, thereby generating a hash value of the image data, wherein the encryption section encrypts the hash value, and the pattern generation section generates pattern image data in which the gradation pattern is presented, based on the encrypted hash value.

In the present invention, the hash value generation section generates the hash value of the image data. Further, the hash value is encrypted by the encryption section, and the pattern generation section generates the pattern image data based on the encrypted hash value.

An image processing apparatus according to the present invention is an image processing apparatus comprising: an obtaining section for obtaining the image data which is generated by the above-mentioned image generating apparatus and to which the additional image data is added; and a separation section for separating the first data and the second data from the additional image data of the obtained image data.

In the present invention, the obtaining section obtains the image data, which is generated by the image generating apparatus and to which the additional image data is added, and the separation section separates the first data and second data from the additional image data.

An image processing apparatus according to the present invention is characterized by further comprising a matching section for matching the first data with the second data, the first data and the second data being separated by the separation section.

In the present invention, the matching section matches the first data with second data, the first data and second data being separated by the separation section, and subsequent processing of the image data is performed on the basis of a result of the matching.

An image processing apparatus according to the present invention is characterized by further comprising a reception section for receiving identification data for identifying a user, wherein the matching section matches the first data with the second data, based on the identification data received by the reception section.

In the present invention; the reception section receives the identification data, and based on the received identification data, the matching section matches the first data with the second data.

An image processing apparatus according to the present invention is characterized by further comprising: a decoding key storage section for storing a decoding key for decoding the encrypted second data, in association with the identification data; a decoding key reading section for reading the decoding key from the decoding key storage section, based on the identification data received by the reception section; and a decoding section for decoding the encrypted second data using the decoding key read by the decoding key reading section, wherein the matching section matches the decoded data decoded by the decoding section, with the first data.

In the present invention, the decoding key storage section stores a decoding key for decoding the encrypted second data so that the decoding key is associated with the identification data, and the decoding key reading section reads, based on the identification data received by the reception section, the decoding key from the decoding key storage section. Furthermore, the decoding section decodes the encrypted second data using the decoding key read by the decoding key reading section, and the matching section matches the decoded data decoded by the decoding section, with the first data.

An image processing apparatus according to the present invention is characterized by further comprising: a decoding key storage section for storing a decoding key for decoding the encrypted second data, in association with the identification data; a decoding key reading section for reading the decoding key from the decoding key storage section, based on the identification data received by the reception section; a decoding section for decoding the encrypted second data using the decoding key read by the decoding key reading section; and a process permission section for permitting, when the decoding has been successfully performed, a process concerning the image data to which the additional image data is added.

In the present invention, the decoding key storage section stores a decoding key for decoding the encrypted second data so that the decoding key is associated with the identification data, and the decoding key reading section reads, based on the identification data received by the reception section, the decoding key from the decoding key storage section. Furthermore, the decoding section decodes the encrypted second data using the decoding key read by the decoding key reading section, and when the decoding has been successfully performed, the process permission section permits a process concerning the image data to which the additional image data is added, thus performing subsequent processing.

An image processing apparatus according to the present invention is characterized by further comprising a storage section for storing a hash value, wherein when the hash value is contained in the second data separated by the separation section, the matching section matches the hash value of the second data with the hash value stored in the storage section.

In the present invention, the storage section stores the hash value, and when the hash value is contained in the second data separated by the separation section, the matching section matches the hash value of the second data with the hash value stored in the storage section.

An image forming apparatus according to the present invention is an image forming apparatus comprising the above-mentioned image generating apparatus,
wherein the image generating apparatus generates image data to which the additional image data is added, and the image forming apparatus forms, on a sheet, an image that is based on the image data.

In the present invention, the image generating apparatus generates image data to which the additional image data is added, and the image forming apparatus forms, on a sheet, an image that is based on the image data.

An image forming apparatus according to the present invention is characterized by further comprising: a display section; and a preview section for displaying, on the display section, a preview image indicative of a result of the formation of the image data on the sheet, and an additional preview image concerning the additional image data, and for further displaying the additional preview image at a given position located on the preview image.

In the present invention, the preview section displays the preview image and the additional preview image on the display section, and displays the additional preview image at a given position on the preview image in accordance with an instruction from a user, for example.

An image forming apparatus according to the present invention is an image forming apparatus comprising the above-mentioned image processing apparatus, wherein when image data to which the additional image data is added has been obtained, the image forming apparatus forms, on a sheet, an image based on the obtained image data, on the basis of a result of the matching by the matching section of the image processing apparatus.

In the present invention, when image data to which the additional image data is added has been obtained, a matching is made by the matching section of the image processing apparatus, and on the basis of a result of the matching, the image forming apparatus forms, on a sheet, an image that is based on the obtained image data.

An image forming apparatus according to the present invention is characterized by further comprising a display section, wherein data concerning a result of the matching by the matching section is displayed on the display section.

In the present invention, data concerning a result of the matching made by the matching section is displayed on the display section.

A recording medium according to the present invention is an image generating method for generating image data based on obtained data, the method comprising: a code generation step of generating, based on first data concerning security of the obtained data, image data indicative of a two-dimensional code having a plurality of cells; an encryption step of encrypting second data concerning security of the obtained data; a pattern generation step of generating, based on the encrypted second data, pattern image data in which a gradation pattern is presented in the cells of the two-dimensional code; and an addition step of adding, to the image data, additional image data which is based on the image data of the two-dimensional code and the pattern image data.

In the present invention, the foregoing computer program is recorded in the recording medium. The computer reads the computer program from the recording medium, and thus the computer implements the foregoing image generating apparatus, image processing apparatus, and image forming apparatus.

Moreover, the image data indicative of the two-dimensional code is generated based on the first data concerning security of the obtained data, the second data concerning security of the obtained data is encrypted, and the pattern image data in which a gradation pattern is presented in the cells of the two-dimensional code is generated based on the encrypted second data. Furthermore, the additional image data, based on the image data of the two-dimensional code and the pattern image data, is added to the image data.

A recording medium according to the present invention is a recording medium readable by a computer sand recording a computer program, the computer program comprising:
an obtaining step of causing a computer to obtain the image data which is generated by the above-mentioned computer program and to which the additional image data is added; a separation step of causing the computer to separate the first data and the second data from the additional image data; and a matching step of causing the computer to match the first data with the second data, the first data and the second data being separated in the separation step.

In the present invention, when the image data to which the additional image data is added has been obtained, the first data and second data are separated from the additional image data, and the separated first data is matched with second data. Based on a result of the matching, subsequent processing is performed.

A recording medium according to the present invention is characterized in that the computer program further comprises: a reception step of causing the computer to receive identification data for identifying a user; and a step of causing the computer to match the first data with the second data, based on the identification data.

In the present invention, the identification data for identifying a user is received, the first data is matched with second data based on the identification data, and subsequent processing is performed based on a result of the matching.

According to the present invention, since the influence of a high frequency component such as a fine line pattern is not exerted, a complicated process for avoiding the influence of a high frequency component is unnecessary, and more data concerning security can be visually added to a limited space, thus allowing security to be more efficiently enhanced, and allowing a user to visually identify the added position of the data concerning security.

The above and further objects and features will more fully be apparent from the following detailed description with accompanying drawings.

BRIEF DESCRIPTION OF THE SEVERAL VIEWS OF THE DRAWINGS

FIG. 5 is an exemplary diagram illustrating examples of density value combination tables in each of which micro gradation data is presented in cells of a QR code according to Embodiment 1 of the present invention;

DETAILED DESCRIPTION

Hereinafter, embodiments of an image generating apparatus, an image processing apparatus, an image generating method, an image processing method, an image reading apparatus, an image forming apparatus, a computer program and a recording medium according to the present invention, which are applied to a digital multi-function peripheral having a copying function, a printing function, etc., will be specifically described with reference to the drawings. It should be noted that for the sake of convenience of description, the description will be made using a QR code as an example of a two-dimensional code.

Embodiment 1

Figure 1:
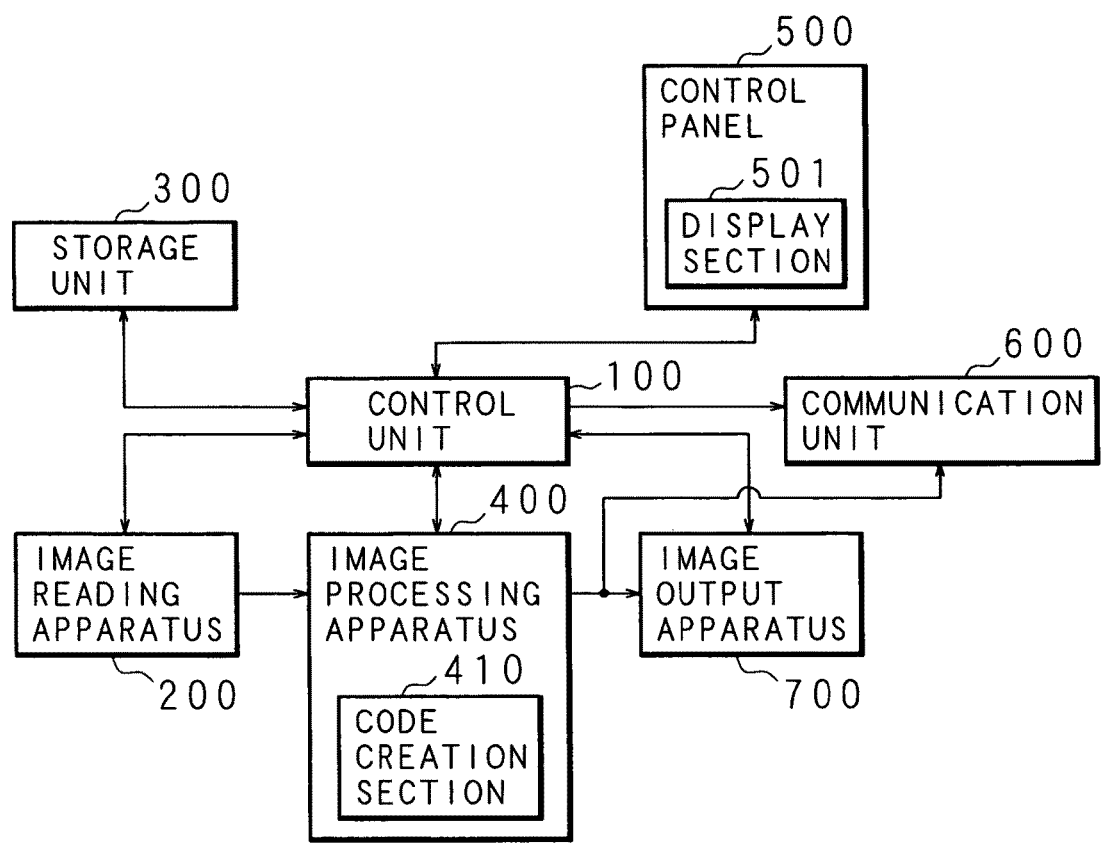
FIG. 1 is a block diagram illustrating principal components of an image forming apparatus according to Embodiment 1 of the present invention.

FIG. 1 is a block diagram illustrating principal components of an image forming apparatus (or an image reading apparatus) according to Embodiment 1 of the Present Invention. The Image forming apparatus according to Embodiment 1 includes hardware devices such as: a control unit 100; an image reading apparatus 200; an image processing apparatus 400 (image generating apparatus); an image output apparatus 700; a storage unit 300; a communication unit 600; and a control panel 500. These hardware devices constitute a digital multi-function peripheral as a whole.

The control unit 100 includes: a CPU for controlling these hardware devices; and a RAM for temporarily storing data (e.g., a public key described later) necessary for carrying out control. The storage unit 300 is a nonvolatile semiconductor memory, for example, in which user name, password for each user, and user-specific secret key (and public key) are stored in association with each other. The storage unit 300 further stores, in advance, image data for image processing, and programs such as: a control program for controlling respective hardware devices; a program for specifying a print position of a QR code indicative of micro gradation data described later; a program for generating a secret key or a decoding key to be used for encryption of second data described later; a program for addition of image data of a gradation QR code described later; a program for displaying an input screen for recommending input of user's name and password; and a program for displaying a selection screen for receiving a selection for deciding whether to continue or to interrupt processing.

The control unit 100 loads a given program from the storage unit 300 when necessary, and executes the loaded program, thereby allowing the entire system to be operated as the image forming apparatus including the image generating apparatus, image processing apparatus and image reading apparatus according to the present invention.

Furthermore, the control panel 500 includes: function buttons such as "fax", "copy", "print" and "mail" buttons concerning important functions of a digital multi-function peripheral; a numeric keypad; an enter key for accepting a received instruction; a cursor-movement key for specifying the position of a QR code described later; and a display section 501 such as a liquid crystal display.

It should be noted that the image reading apparatus 200 optically reads image data of a document. Further, the image reading apparatus 200 includes: a light source for applying light to a document to be read; and an optical unit (reading means) having an image sensor or the like such as a CCD (Charge Coupled Device), for example. The image reading apparatus 200 focuses an optical image reflected from a document set at a given read position, on the image sensor, and outputs RGB (R: Red, G: Green, and B: Blue) analog electric signals. The analog electric signals outputted from the image reading apparatus 200 are inputted to the image processing apparatus 400.

The communication unit 600 includes a network card, a modem, etc. for transmitting image data, which has been subjected to processing by the image processing apparatus 400, to outside. For example, the communication unit 600 attaches the image data to an e-mail, and transmits it to a set transmission destination.

Based on the image data outputted from the image processing apparatus 400, the image output apparatus 700 forms an image on a sheet such as a paper sheet or an OHP film, and outputs a resulting document. For that purpose, the image output apparatus 700 includes: a photoconductor drum; a charging device for electrically charging the photoconductor drum to a predetermined potential; a laser writing device for emitting laser light in accordance with the image data received from outside, thereby generating an electrostatic latent image on the photoconductor drum; a developing device for supplying a toner to the electrostatic latent image formed on a surface of the photoconductor drum, thereby making the image visible; and a transfer device for transferring a toner image, which has been formed on the surface of the photoconductor drum, onto a paper sheet (it should be noted that these components of the image output apparatus 700 are not illustrated). Thus, the image output apparatus 700 forms an image, which is desired by a user, on a sheet by an electrophotography method. It should be noted that in addition to the image formation performed by an electrophotography method using the laser writing device, image formation may be performed by an ink jet method, a thermal transfer method, a sublimation method, etc.

The image processing apparatus 400 generates image data in digital form based on the analog electric signals inputted through the image reading apparatus 200 or reads the image data stored in the storage unit 300, carries out processing in accordance with the type of each image, and then generates output image data. Furthermore, the image processing apparatus 400 includes a code creation section 410 (addition section). The code creation section 410 generates image data of a gradation QR code described later, which should be added to image data concerning output or image data that is based on data inputted through the image reading apparatus 200, and adds the generated image data of the gradation QR code to the image data. The output image data, which is generated by the image processing apparatus 400 and to which the image data of the gradation QR code is added, is outputted to the image output apparatus 700 or the communication unit 600.

Figure 2:
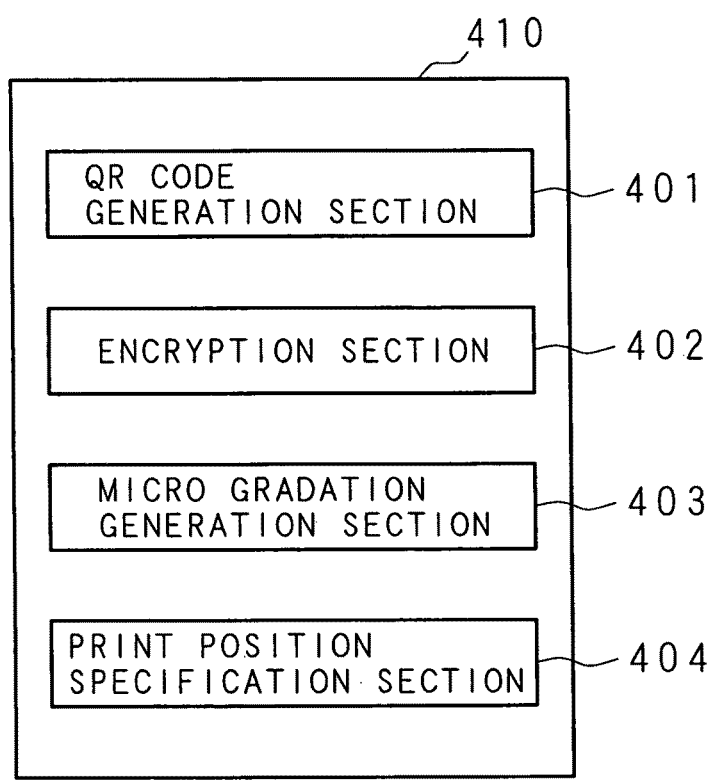
FIG. 2 is a block diagram illustrating principal components of a code creation section of the image forming apparatus according to Embodiment 1 of the present invention.

FIG. 2 is a block diagram illustrating principal components of the code creation section 410 of the image forming apparatus according to Embodiment 1 of the present invention. The code creation section 410 includes: a QR code generation section 401; an encryption section 402; a micro gradation generation section 403; and a print position specification section 404.

Based on first data concerning security when image data based on data obtained from the image reading apparatus 200 is handled, e.g., when the image data is printed, attached to an e-mail and transmitted, and transmitted to outside, the QR code generation section 401 generates image data of a QR code, which should be added to the image data.

Using a secret key of a creator of the image data, for example, the encryption section 402 encrypts second data concerning security when the image data based on data obtained from the image reading apparatus 200 is handled, e.g., when the image data is printed, attached to an e-mail and transmitted, and transmitted to outside.

The first data and the second data are, for example, the name of the creator of the image data, an ID, a number by which the document creator is identified, contact information, etc., but may be any information as long as the creator of the image data can be identified. Moreover, the first data and the second data do not necessarily have to be identical, but may be different from each other.

Herein, the secret key is one that is commonly and widely used as a public key and a secret key in "public cryptography", and procedural steps of "digital signature" in which public cryptography is utilized will be briefly described below.

(1) A creator (transmitter) of electronic data concerning a document prepares (creates) a secret key and a public key. (2) The creator (transmitter) of the electronic data transmits the public key to a receiver of the electronic data using e-mail, WEB, letter or the like. (3) The creator (transmitter) of the electronic data encrypts the electronic data using the secret key created in Step (1), and sends the encrypted electronic data to the receiver of the electronic data using e-mail, FTP, printed matter or the like. (4) Using the public key obtained in Step (2), the receiver of the electronic data decodes the electronic data obtained in Step (3). (5) When the decoding is successfully performed in Step (4), the creator (transmitter) of the electronic data can be identified.

Furthermore, in regard to encryption and decoding performed using a public key and a secret key, RSA cryptography is commonly known. Hereinafter, the general outlines of RSA cryptography will be described.

A public key of RSA cryptography includes a pair of natural numbers e and n. The n is the product of two prime numbers p and q, and the e is defined as a positive integer that will satisfy the following equation: gcd (e, $\phi$(n))=1(gcd: greatest common divisor). The $\phi$(n) is an Euler's function, and is represented by the following equation: $\phi$(n)=$\phi$(p)$\phi$(q) =(p−1)(q−1). Then, there exists an inverse element of e, modulo $\phi$(n), and the inverse element is represented by d(1≤d≤p−1). In this case, ed≡1(mod$\phi$(n)) is established. Therefore, for x(0≤x<n), $x^{ed}$≡x(modn) is established by Euler's theorem. Accordingly, due to the above-described properties, if d is known, x is determined from $x^e$. Specifically, x(0≤x<n) is encrypted by e to create a cryptogram $x^e$ (e: encryption key (secret key)), and the cryptogram $x^e$ is decoded by d (d: decoding key (public key)).

It should be noted that the secret key obtained in this manner may be inputted through a keyboard or the like by a document creator, for example, when a document is created, and may be stored in advance in the storage unit 300 in association with user identification data. In the following description, the case where the secret key is stored in advance in the storage unit 300 will be described by way of example.

Based on the second data encrypted by the encryption section 402, the micro gradation generation section 403 generates image data of micro gradation (gradation pattern) including a plurality of regions having different densities, presented in cells of the QR code.

Figure 3:
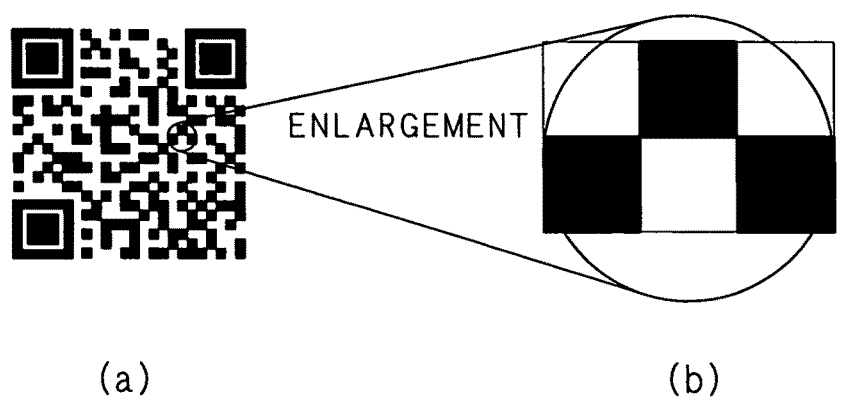
FIG. 3 is an explanatory diagram for describing addition of second data performed by a micro gradation generation section of the image forming apparatus according to Embodiment 1 of the present invention.

Hereinafter, the generation of the second data (micro gradation) and the addition thereof to the QR code by the micro gradation generation section 403 will be described. FIG. 3 is an explanatory diagram for describing the addition of the second data by the micro gradation generation section 403 of the image forming apparatus according to Embodiment 1 of the present invention. For example, (a) of FIG. 3 illustrates a QR code image when a character string "This is test." is converted into a QR code, and (b) of FIG. 3 is an enlarged view in which a part of the QR code image (i.e., the circled area on (a) of FIG. 3) is enlarged. Information provided by the enlarged view of (b) of FIG. 3 includes information "010101" when white is replaced with "0" and black is replaced with "1".

Figure 4:
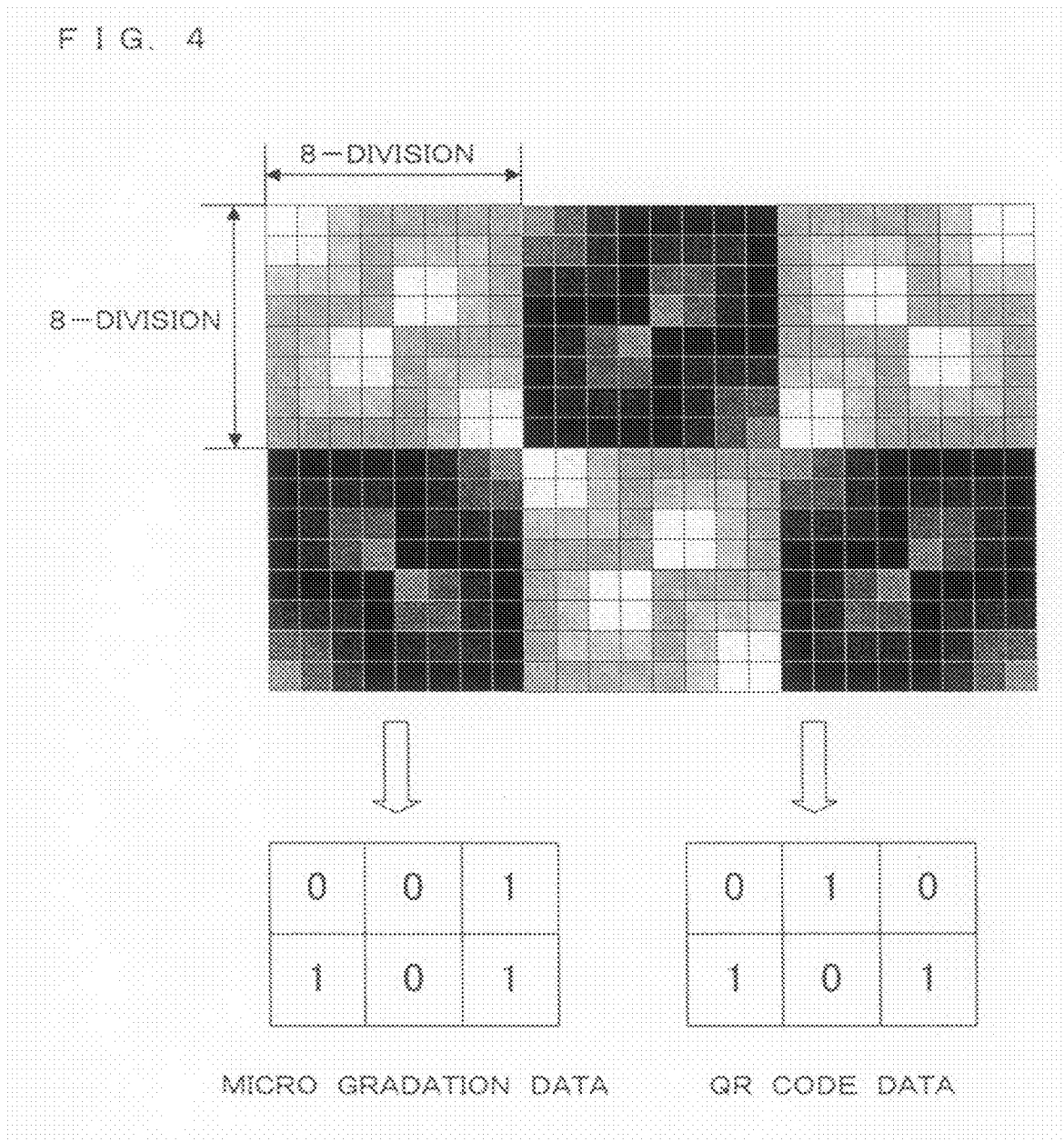
FIG. 4 is an exemplary diagram illustrating a case where data "001101" provided by encrypting the second data is presented by micro gradation in cells of a QR code illustrated in (a) of FIG. 3.
Figure 6:
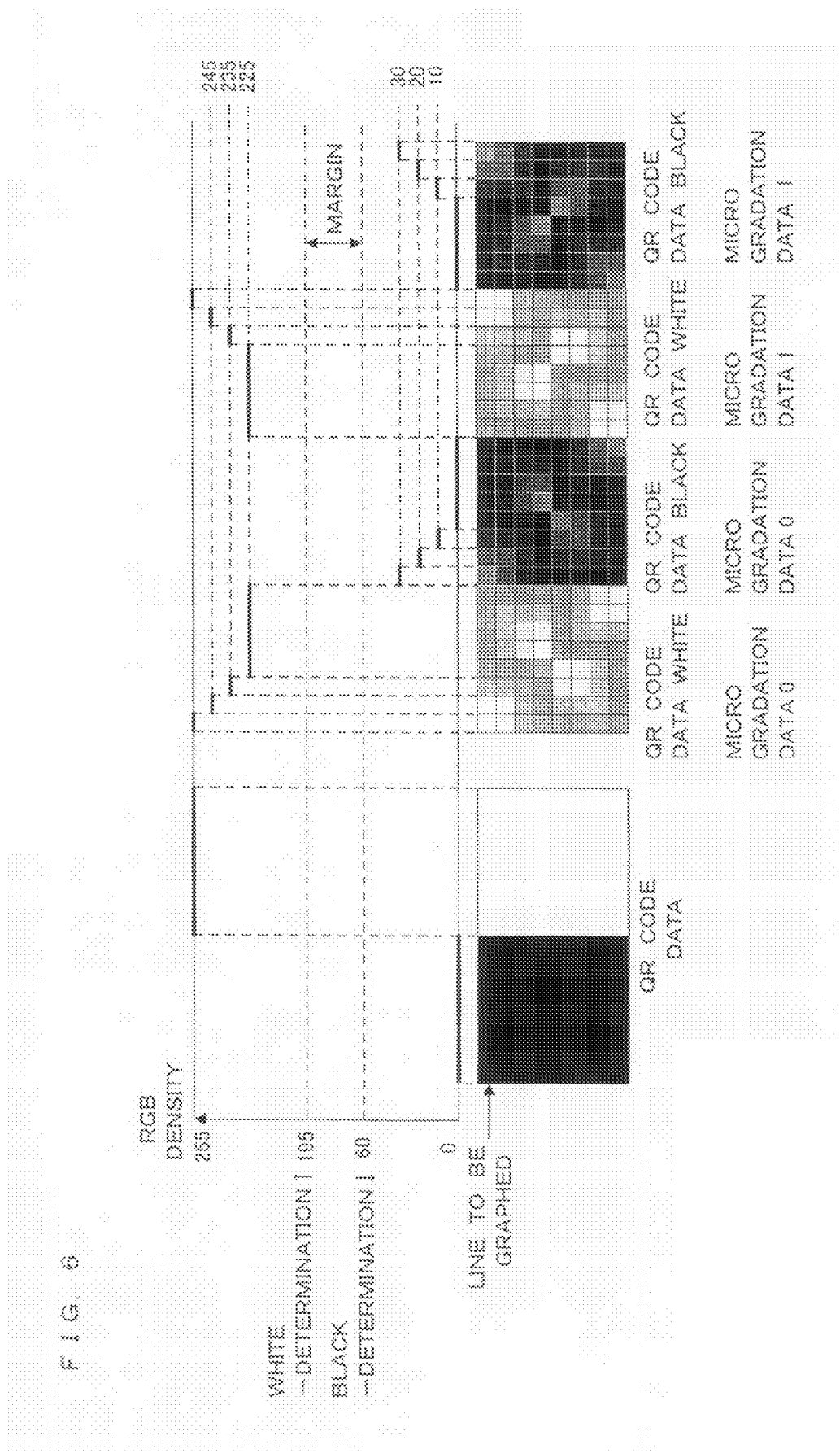
FIG. 6 is an explanatory diagram for describing the structures of the density value combination tables and determination made using the tables according to Embodiment 1 of the present invention.

FIG. 4 is an exemplary diagram illustrating a case where data "001101" resulting from encryption of the second data is presented by micro gradation in cells of the QR code (black or white regions thereof) illustrated in (a) of FIG. 3. In this diagram, each cell of the QR code is divided into an 8 by 8 matrix, and one bit of encrypted second data (hereinafter called "encrypted second data") is presented in each cell. This process is enabled by using four types of density value combination tables in total as illustrated in FIG. 5 (by conversion into table values), in which when the black cells of the QR code are each defined as an RGB density value "0" and the white cells of the QR code are each defined as an RGB density value "255", "0" or "1" of the encrypted second data is presented in each cell of the QR code. Further, the values of these density value combination tables are provided by using density values in a predetermined range. FIG. 6 is an explanatory diagram for describing the structures of the density value combination tables and determination made using the tables. In the determination made in the QR code of the second data, settings are made so that the density values equal to or greater than 195 are determined as white, while the density values equal to or smaller than 60 are determined as black, and a margin of density values ranging from 60 to 195 is used in determining white and black. On the other hand, in generating, based on the encrypted second data, micro gradation in the cells of the QR code, settings are made so that only the density values ranging from 0 to 30 and the density values ranging from 225 to 255 are used.

In this case, no high frequency component will get into an element, constituting micro gradation concerning one bit of data, by performing a process for generating micro gradation indicative of one bit of the encrypted second data on each cell of the QR code (in other words, since gradation is added to so-called solid areas, no frequency components such as a white line and a black line are contained). Therefore, the micro gradation generation process can be implemented in a very simple manner, and the necessity for a complicated process for avoiding the difficulty of reading micro gradation when a high frequency component is contained is eliminated.

Figure 7:
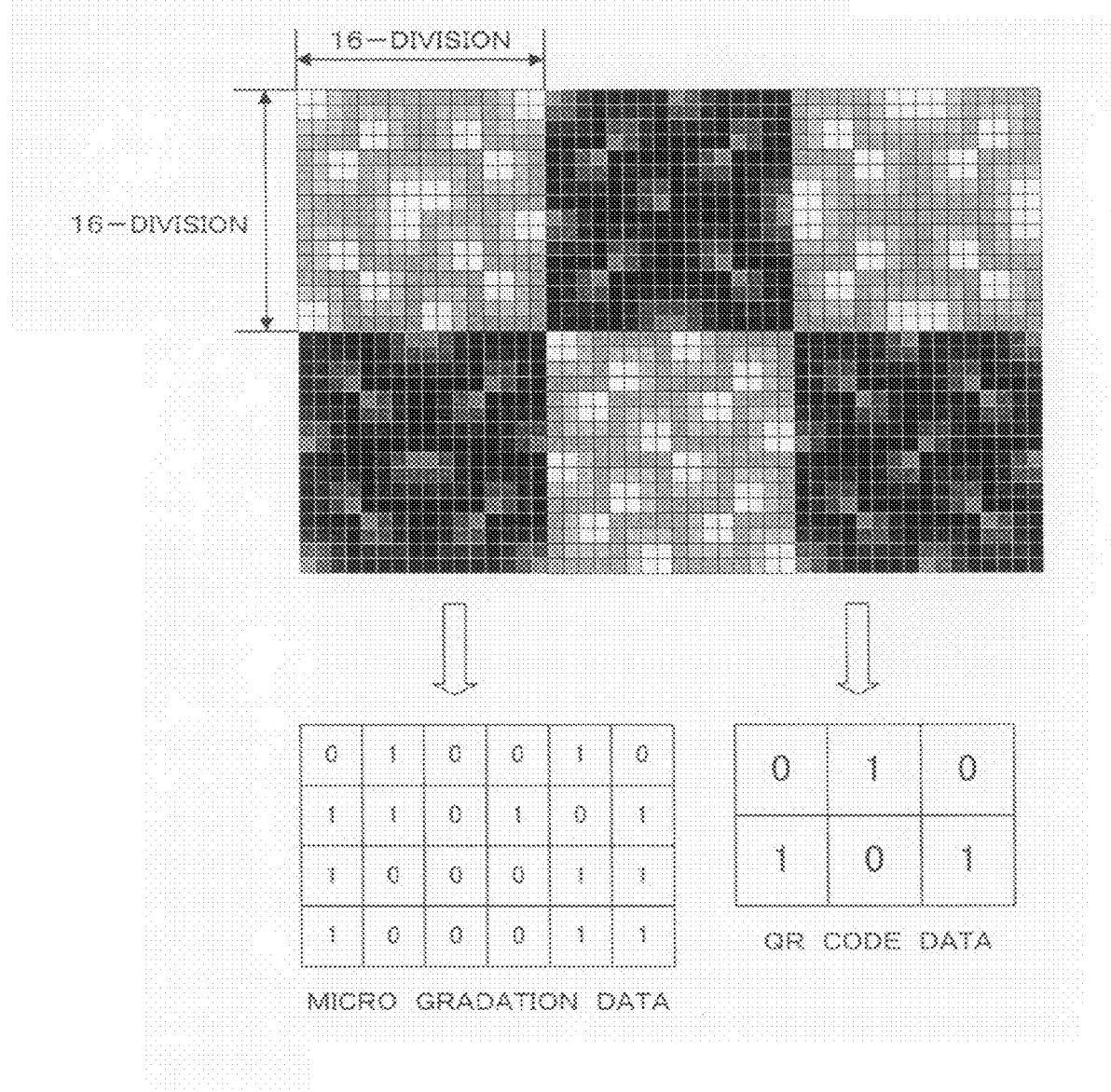
FIG. 7 is an exemplary diagram illustrating another example of the density value combination table according to Embodiment 1 of the present invention.

FIG. 4 illustrates, by way of example, the case where each cell of the QR code is allocated to one bit of the encrypted second data, but when allocation for more encrypted second data is needed, each cell of the QR code may alternatively be divided into a 16 by 16 matrix as illustrated in FIG. 7, thereby allowing the amount of data to quadruple. The division of each cell of the QR code is carried out using an integral multiple of 8 (to be more precise, the division of each cell of the QR code is dependent on a gradation structure necessary for the micro gradation generation process. In the description of Embodiment 1, a value of 8 is presented because 8×8 micro gradation is used by way of example.) It should be noted that in Embodiment 1, the QR code and micro gradation are both presented in the form of black and white data (K data).

When output image data is printed, the print position specification section 404 specifies a position on a recording sheet (which will hereinafter be called a "print position"), at which the image of a QR code (hereinafter called a "gradation QR code") that has been subjected to the micro gradation generation process should be displayed. As a method for specifying the print position of a gradation QR code, a document creator may input (specify) the position by freely using the control panel 500 when a document is created, for example, or a decision may be made so that printing is performed on a predetermined position (e.g., a position located at a right end of a header) using software.

Hereinafter, detailed description will be made about a process for generating output image data by adding image data of a gradation QR code to image data that is based on data obtained from the image reading apparatus 200 (i.e., obtained data) in the image forming apparatus according to Embodiment 1 of the present invention.

Figure 8:
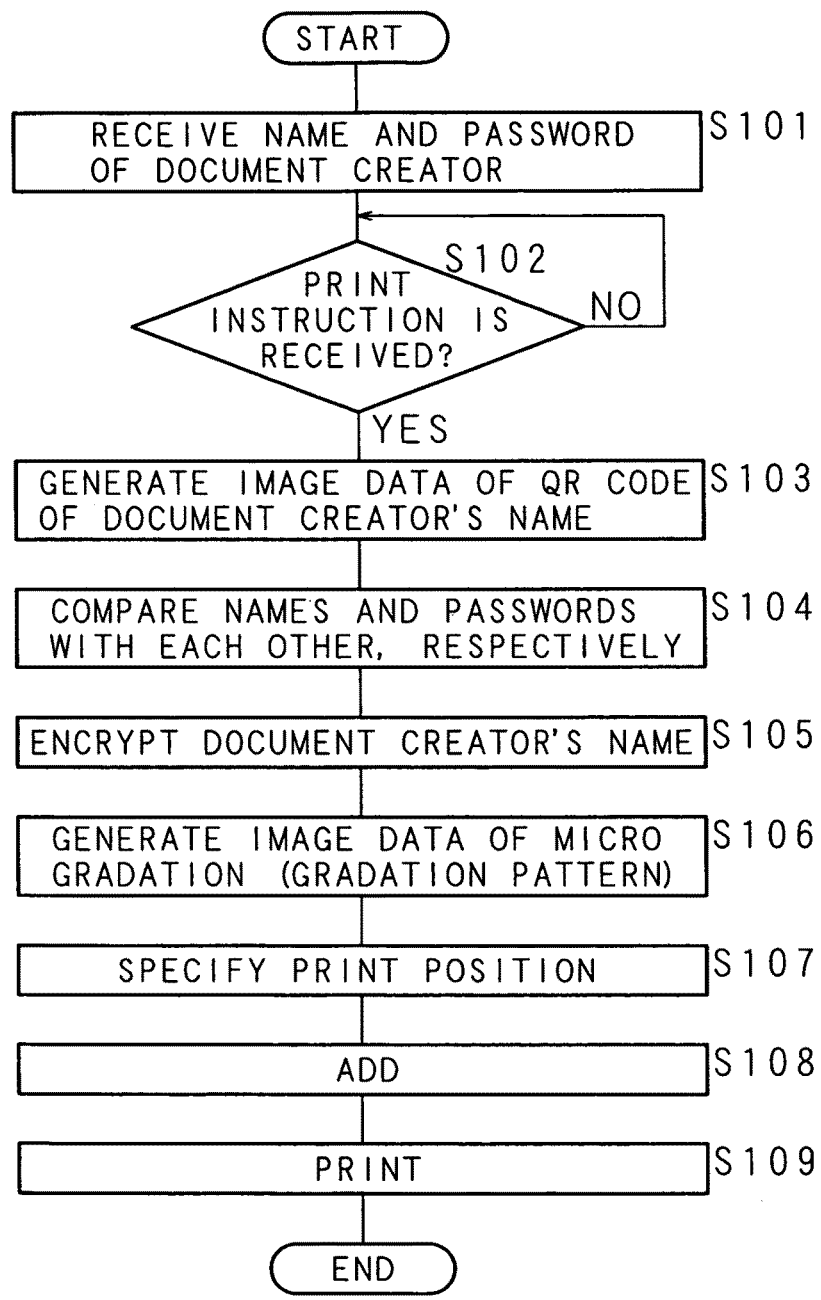
FIG. 8 is a flow chart illustrating processing performed by a control unit when image data of a gradation QR code is generated and added to image data that is based on obtained data in the image forming apparatus according to Embodiment 1 of the present invention.

FIG. 8 is a flow chart illustrating processing performed by the control unit 100 when image data of the gradation QR code is generated and added to image data that is based on obtained data in the image forming apparatus according to Embodiment 1 of the present invention. For the sake of convenience of description, the following description will be made, by way of example, about a case where the first data and the second data are both the name of a document creator, the image forming apparatus according to Embodiment 1 of the present invention is capable of editing image data via the control panel 500, and the document creator edits image data read from a given document to create new image data. It should be noted that the present invention is not limited to this example, but may also be applied to a case where the image forming apparatus according to Embodiment 1 of the present invention is connected to electrical equipment such as a PC or a PDA having the function of editing/creating image data.

Before reading a given document, the document creator first inputs his or her name and password by operating the control panel 500. Thus, the CPU of the control unit 100 receives the name (fist data) and password of the document creator via the control panel 500 (Step S101). In this description, the case where only one document creator exists is taken by way of example, but if a plurality of document creators exist, the names of the plurality of document creators may be inputted, or number, contact information, etc., by which each person can be identified, may be inputted other than names. It should be noted that the present invention is not limited to such an example, but other materials, reference literature, document update history, team member name, etc., created by the document creator(s), may be used.

Subsequently, the document creator provides an instruction for reading the document, and the CPU receives the instruction via the control panel 500 and instructs the image reading apparatus 200 to read the document. Image data read by the image reading apparatus 200 is temporarily stored in the storage unit 300, and an image based on the image data is displayed on the display section 501 of the control panel 500. While making reference to the image, the document creator edits the image data by operating the control panel 500, thereby creating image data. Upon completion of editing of the image data, the document creator presses the "print" key of the control panel 500 in order to print the image concerning the edited image data on a recording sheet.

The CPU monitors, for example, an operation performed on the "print" key of the control panel 500, thus determining whether or not a "print" instruction has been received (Step S102). When it is determined that no "print" instruction has been received (Step S102: NO), the CPU is on standby until the "print" instruction is received. On the other hand, when it is determined that the "print" instruction has been received (Step S102: YES), the CPU generates, from the document creator name received in Step S101, image data of a QR code (Step S103). This step is carried out by instructing, from the CPU, the QR code generation section 401 of the code creation section 410 to convert the document creator name into a QR code, i.e., to generate image data of a QR code based on the document creator name.

Next, based on data stored in the storage unit 300, the CPU matches the document creator name and password received in Step S101 (Step S104). When the document creator name and password coincide with those stored in the storage unit 300, the CPU provides an instruction to the encryption section 402 of the code creation section 410, thereby encrypting the document creator name (Step S105). In response to the instruction from the CPU, the encryption section 402 obtains a secret key concerning the document creator name (user) from the storage unit 300, and encrypts the document creator name (second data) using the secret key.

On the other hand, when the document creator name and password do not coincide with those stored in the storage unit 300, the CPU displays, on the display section 501, text data indicating that the document creator name and password do not coincide with those stored in the storage unit 300, and the input screen for recommending re-input of the document creator name and password.

It should be noted that the secret key may be inputted by the document creator via the control panel 500 when the document creator creates the document. In such a case, a process for determining whether or not the document creator name or password stored in the storage unit 300 coincides with the inputted secret key may be provided.

The CPU generates image data of micro gradation (gradation pattern), which is based on the encrypted document creator name and should be presented in cells of the QR code, by means of the encryption section 402 (Step S106). This step is carried out by instructing, from the CPU, the micro gradation generation section 403 to generate image data of micro gradation that is based on the encrypted document creator name. A process for generating image data of micro gradation is performed by the micro gradation generation section 403 as described above, and therefore, the detailed description thereof will be omitted. As a result of the above-described steps, the image data of the gradation QR code, in which micro gradation concerning the encrypted second data is presented, is generated in the cells of the QR code concerning the first data.

Subsequently, the CPU provides an instruction to the print position specification section 404, thereby specifying a position on a recording sheet, at which the gradation QR code should be printed (Step S107). For example, the image forming apparatus according to Embodiment 1 is configured so that printing is performed on a position at a right end of a header by a given program.

The CPU instructs the code creation section 410 to add the image data of the gradation QR code (additional image data) to the edited image data so that the gradation QR code is printed based on the specified print position, i.e., printed on the print position on the recording sheet at the time of printing (Step S108). As a result of the above-described steps, output image data is generated.

Figure 9:
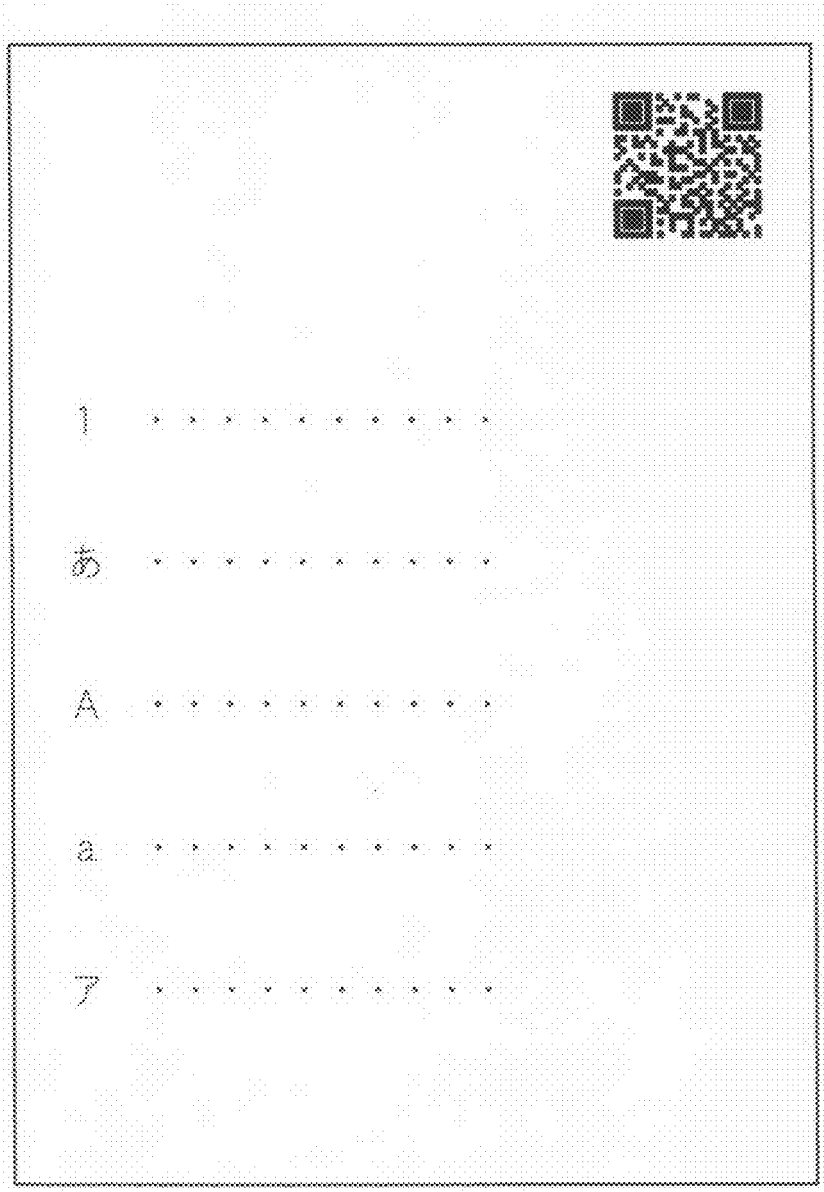
FIG. 9 is an exemplary diagram illustrating an example of a document printed by an image output apparatus according to Embodiment 1 of the present invention.

The CPU provides an instruction to the image output apparatus 700 to print, on the recording sheet, an image that is based on the output image data (Step S109), and then ends the process. In response to the instruction from the CPU, the image output apparatus 700 performs printing of the image that is based on the output image data. On the document printed by the image output apparatus 700, the gradation QR code is printed at a position located at a right end of a header. FIG. 9 is an exemplary diagram illustrating an example of the document printed by the image output apparatus 700.

Embodiment 2

Figure 10:
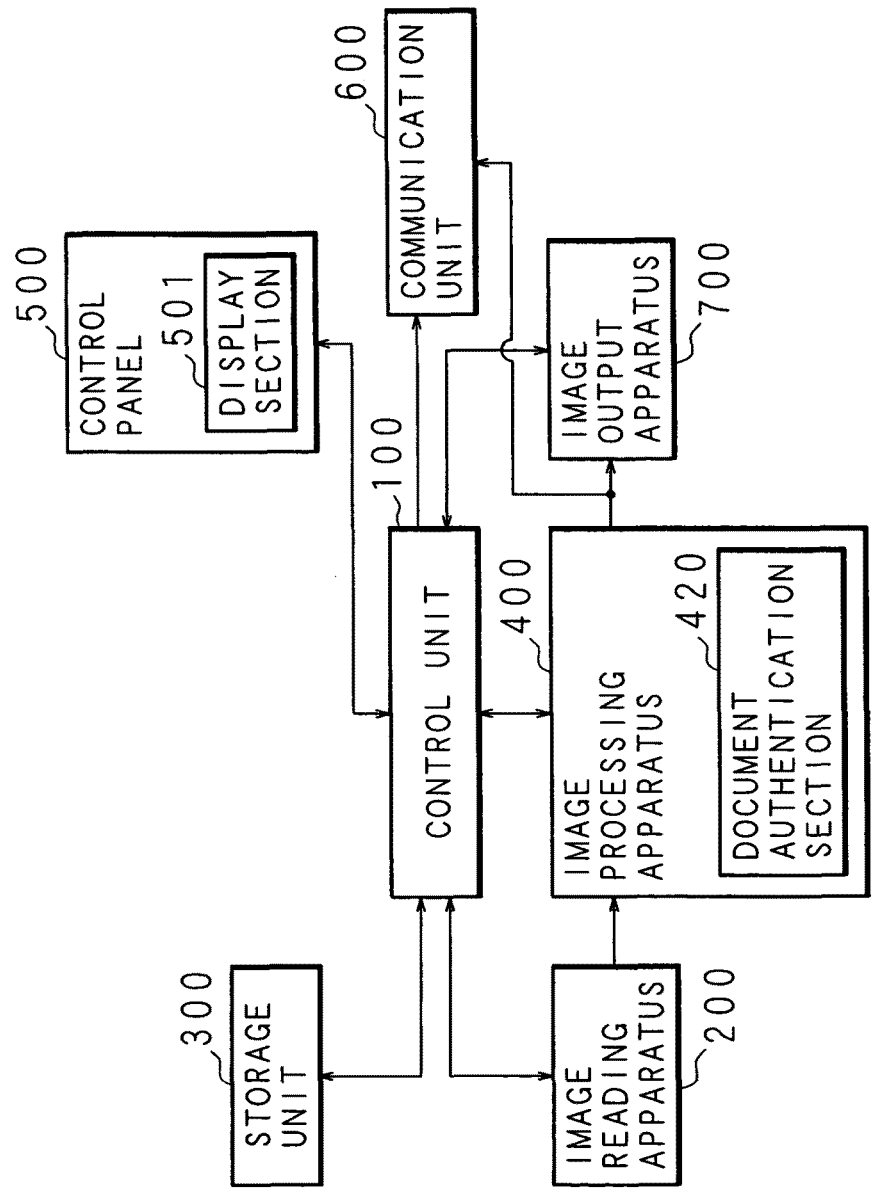
FIG. 10 is a block diagram illustrating principal components of an image forming apparatus according to Embodiment 2 of the present invention.

FIG. 10 is a block diagram illustrating principal components of an image forming apparatus according to Embodiment 2 of the present invention (or an image processing apparatus or an image reading apparatus). Similarly to the image forming apparatus according to Embodiment 1, the image forming apparatus according to Embodiment 2 includes hardware devices such as: a control unit 100; an image reading apparatus 200 (reading section); an image processing apparatus 400; an image output apparatus 700; a storage unit 300; a communication unit 600; and an control panel 500 (reception section), and these hardware devices constitute a digital multi-function peripheral as a whole. Further, the image processing apparatus 400 includes a document authentication section 420. It should be noted that similarly to Embodiment 1, the image processing apparatus 400 may be configured to include a code creation section 410.

Figure 11:
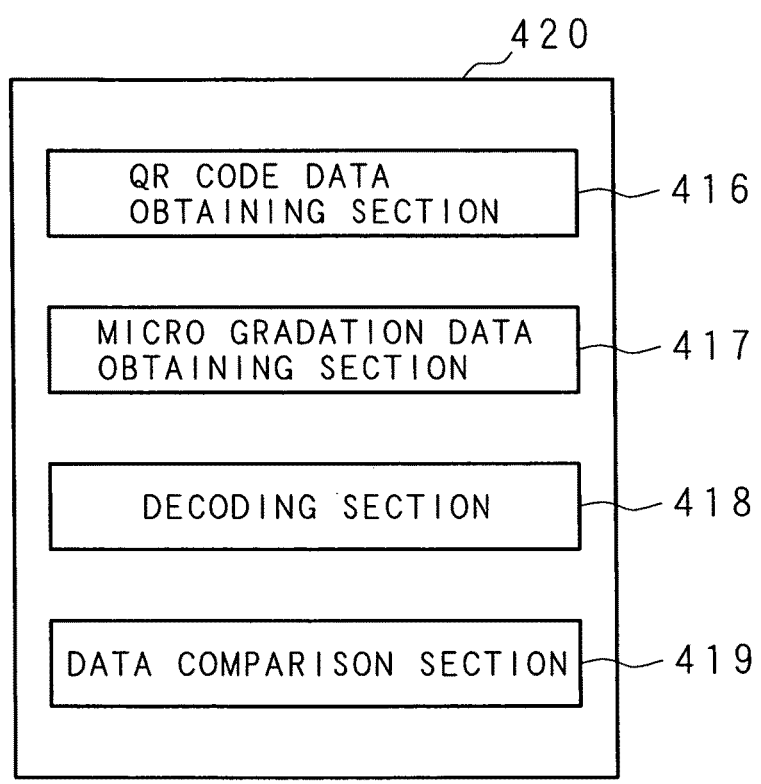
FIG. 11 is a block diagram illustrating principal components of a document authentication section of an image processing apparatus in the image forming apparatus according to Embodiment 2 of the present invention.

FIG. 11 is a block diagram illustrating principal components of the document authentication section 420 of the image processing apparatus 400 in the image forming apparatus according to Embodiment 2 of the present invention. The document authentication section 420 includes: a QR code data obtaining section 416 (separation section); a micro gradation data obtaining section 417 (separation section); a decoding section 418; and a data comparison section 419 (matching section).

From QR code image data of document image data read by the image reading apparatus 200 (obtaining section and reading section), the QR code data obtaining section 416 obtains (extracts) first data (hereinafter called "QR code data") that is converted into a QR code. The QR code data obtaining section 416 can obtain the QR code data by identifying the position of the QR code based on a cut-out symbol of the QR code.

From the QR code image data of the document image data read by the image reading apparatus 200, the micro gradation data obtaining section 417 obtains encrypted second data (hereinafter called "micro gradation data") concerning micro gradation generated in cells of the QR code as illustrated in FIGS. 4 and 7.

Using a predetermined public key (decoding key), the decoding section 418 decodes the micro gradation data obtained by the micro gradation data obtaining section 417.

The data comparison section 419 compares the QR code data (first data) obtained by the QR code data obtaining section 416, with the second data obtained by the micro gradation data obtaining section 417 and decoded by the decoding section 418.

Hereinafter, description will be made about a case where a document (image data), printed by the image forming apparatus according to Embodiment 1 and provided with the gradation QR code, is handled by the image forming apparatus according to Embodiment 2. For the sake of convenience of description, the description will be made, by way of example, about a case where a predetermined user copies a document printed by the image forming apparatus according to Embodiment 1. Further, a document creator name (first data) converted into a QR code as QR code data is attached to the document provided with the gradation QR code, and the same document creator name is generated as micro gradation data (second data) in the cells of the QR code. It should be noted that user name, password for each user, and user-specific secret key (and public key) are stored in association with each other in the storage unit 300 (decoding key storage means) similarly to Embodiment 1.

Figure 12:
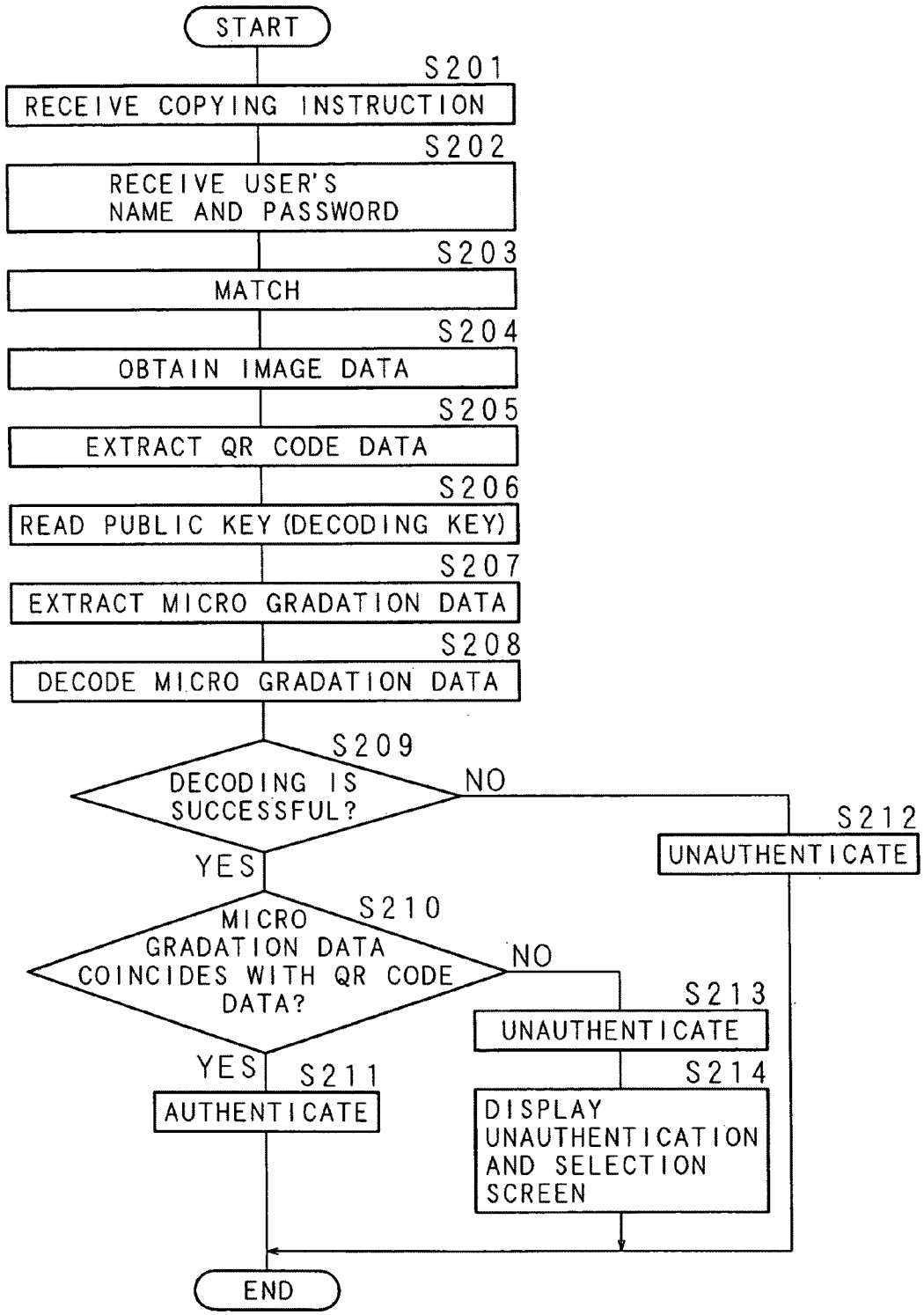
FIG. 12 is a flow chart illustrating a copying process by the image forming apparatus according to Embodiment 2 of the present invention on a document provided with the gradation QR code.

FIG. 12 is a flow chart illustrating a copying process by the image forming apparatus according to Embodiment 2 of the present invention on a document provided with the gradation QR code.

A user who tries to copy a document provided with the gradation QR code puts the document on a document table, and then operates the control panel 500 to provide an instruction for copying of the document.

The CPU of the control unit 100 receives the user's copying instruction via the control panel 500 (Step S201). When the user's instruction has been received, the CPU displays, on the display section 501, the input screen for requesting input of the user's name and password by using a program stored in the storage unit 300. In response to the input of the user's name and password by user's operation on the control panel 500, the CPU receives the user's name and password via the control panel 500 (Step S202).

The CPU, which has received the user's name and password, matches the user's name and password based on the data stored in the storage unit 300 (Step S203). When the user's name and password coincide with those stored in the storage unit 300, the CPU provides an instruction to the image reading apparatus 200 to read image data of the document, thereby obtaining the image data of the document (Step S204).

On the other hand, when the user's name and password do not coincide with those stored in the storage unit 300, the CPU displays, on the display section 501, a text indicating that the user's name and password do not coincide with those stored in the storage unit 300, and the input screen for recommending re-input of the user's name and password.

Subsequently, the CPU provides an instruction to the QR code data obtaining section 416 to extract (separate) QR code data from the image data of the document (Step S205). In response to the instruction from the CPU, the QR code data obtaining section 416 identifies the position of the QR code based on a cut-out symbol of the QR code, and extracts the QR code data from the image data of the document. As a result of this step, a document creator name (first data) can be obtained.

Then, based on the user's name (or password) received in Step S202, the CPU (decoding key reading section) reads, from the data stored in the storage unit 300 (decoding key storage means), a public key (decoding key) that is used to decode micro gradation data (Step S206). However, the present invention is not limited to this, but the public key may alternatively be inputted through the control panel 500 by the user. The obtained public key is temporarily stored in the RAM of the control unit 100.

Next, the CPU provides an instruction to the micro gradation data obtaining section 417 to extract (separate) micro gradation data (encrypted second data) from the image data of the document (Step S207). In response to the instruction from the CPU, the micro gradation data obtaining section 417 extracts the micro gradation data from the image data of the document, and can thus obtain the encrypted second data.

In this case, the micro gradation data based on the encrypted second data is presented in the cells of the QR code that is based on the first data, and therefore, the position at which the second data is attached can be easily visually identified. For example, even when the micro gradation data is read using a camera function of a mobile phone, the position of the micro gradation data, the difference of which from a pictorial design serving as a ground cannot be easily spotted by the naked eye, can be grasped with ease.

Furthermore, the CPU provides an instruction to the decoding section 418 to decode the micro gradation data (Step S208). In response to the instruction from the CPU, the decoding section 418 reads the public key stored in the RAM of the control unit 100, and decodes the micro gradation data using the public key.

Subsequently, the CPU determines whether or not the decoding has been successfully performed by the decoding section 418 (Step S209). When it is determined that the decoding has not been successfully performed by the decoding section 418 (Step S209: NO), the CPU determines that the document (image data) is unreliable and unauthenticated (Step S212), and then ends the process.

On the other hand, when it is determined that the decoding has been successfully performed by the decoding section 418 (Step S209: YES), the CPU instructs the data comparison section 419 to compare the micro gradation data (second data) decoded by the decoding section 418, with the QR code data (first data) obtained in Step S205. It should be noted that based on the comparison result obtained by the data comparison section 419, the CPU determines whether or not the micro gradation data coincides with the QR code data (Step S210).

When it is determined that the micro gradation data does not coincide with the QR code data (Step S210: NO), the CPU determines that the document (image data) is unreliable and unauthenticated (Step S213). In this case, the CPU displays, on the display section 501 of the control panel 500, a result of the determination, i.e., information indicating that the micro gradation data does not coincide with the QR code data, and the selection screen for receiving a selection for deciding whether to continue or to interrupt subsequent processing (Step S214), and then ends the process.

It should be noted that the CPU may thereafter stop the execution of the copying instruction received in Step S201, and may abandon the image data or provide a notification or the like to the document creator concerning the QR code via the communication unit 600. Thus, damage resulting from forgery or the like of the document by a malicious person can be prevented from occurring, for example.

On the other hand, when it is determined that the micro gradation data coincides with the QR code data (Step S210: YES), the CPU determines that the document (image data) is reliable, and authenticates the document (Step S211), thus ending the process.

Thereafter, the CPU executes the copying instruction received in Step S201.

As described above, the document creator name (first data) is converted into a QR code and added onto a document, and then the micro gradation data (second data) is further generated and added to the cells of the QR code, thus making it possible to minimize a paper area occupied by the addition of these pieces of data to the document, and to create the highly reliable document.

Components similar to those of Embodiment 1 are identified by the same reference characters, and the detailed description thereof will be omitted.

Embodiment 3

An Image Forming Apparatus According to Embodiment 3 has a configuration similar to that of the image forming apparatus according to Embodiment 1, but a process performed in the encryption section 402 of the code creation section 410 is different. More specifically, although the encryption section 402 of the image forming apparatus according to Embodiment 1 encrypts only the document creator name (see Step S105), the encryption section 402 of the image forming apparatus according to Embodiment 3 encrypts data for limiting the utilization of a document to be printed (or image data concerning the document) in addition to the document creator name. For example, when the document creator wishes to identify a person whose utilization of the document is permitted/prohibited, data that identifies said person is encrypted by the encryption section 402. For the sake of convenience, the following description will be made, by way of example, about a case where data (e.g., name, ID code or the like), by which a person who is permitted to copy the document (hereinafter called a "person having permission for copying") can be identified, is encrypted by the encryption section 402.

The encryption section 402 of the image forming apparatus according to Embodiment 3 performs encryption using a public key specific to the person having permission for copying. Specifically, in the document printed by the image forming apparatus according to Embodiment 3, the micro gradation of data concerning identification of the person having permission for copying is presented in the cells of the QR code that is based on the document creator name. The document, the printing of which is carried out by the image forming apparatus according to Embodiment 3 and the copying of which is limited in this manner, will be hereinafter referred to as a "copying-limited document".

When the image forming apparatus according to Embodiment 3 copies the copying-limited document printed in the above-described manner, the copying-limited document is copied by making reference to the micro gradation data indicative of the person having permission for copying.

Figure 13:
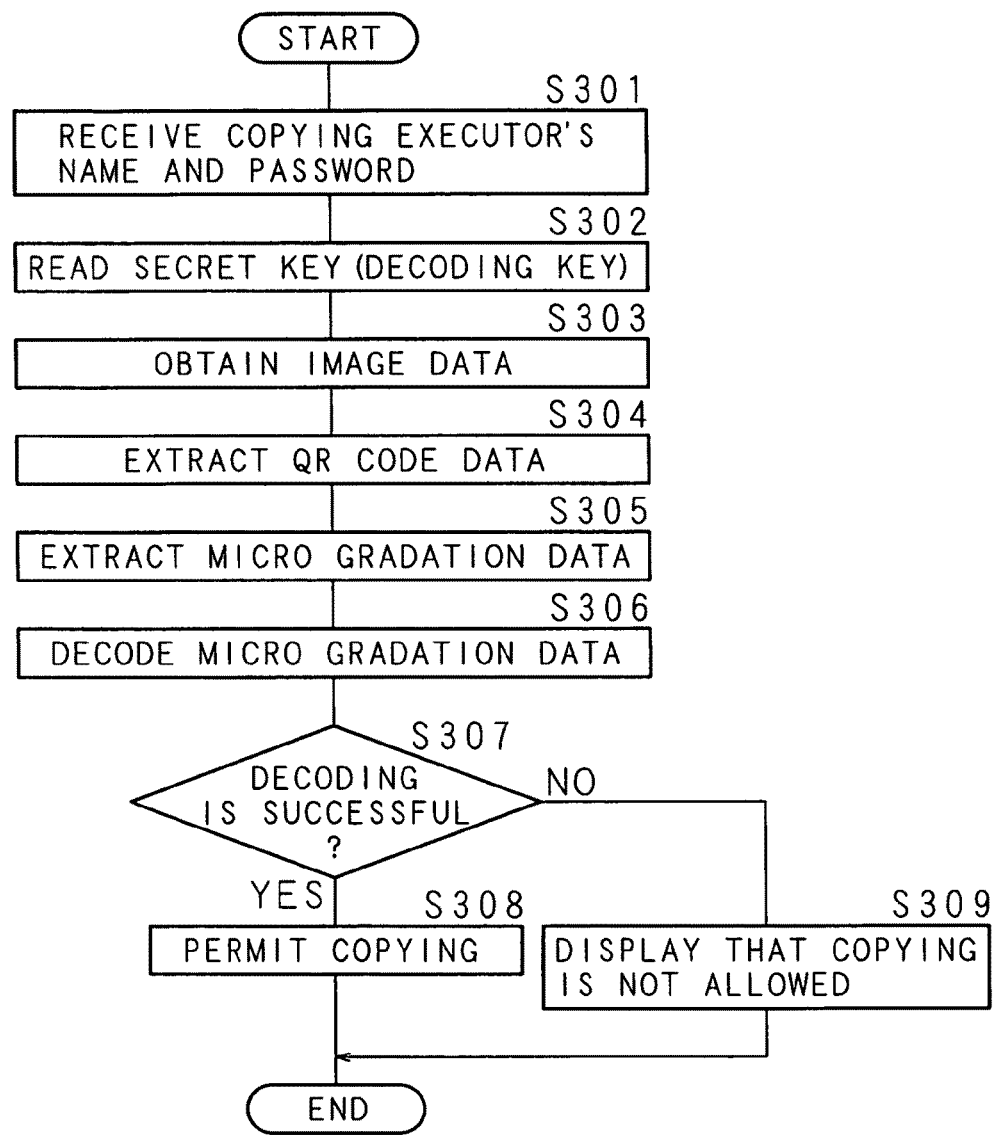
FIG. 13 is a flow chart illustrating an example of a copying process performed on a copying-limited document by the image forming apparatus according to Embodiment 3 of the present invention.

FIG. 13 is a flow chart illustrating an example of a copying process performed on the copying-limited document by the image forming apparatus according to Embodiment 3 of the present invention. Hereinafter, for the sake of convenience of description, a case where a predetermined copying executor copies the copying-limited document will be described by way of example. In the copying-limited document, the micro gradation data concerning the person having permission for copying (second data) is presented in the cells of the QR code that is based on the document creator name (first data). It should be noted that user name, password for each user, and user-specific secret key (and public key) are stored in association with each other in the storage unit 300 (decoding key storage means) similarly to Embodiment 1.

Before copying the copying-limited document, the copying executor first inputs his or her name and password by operating the control panel 500. Thus, the CPU of the control unit 100 receives the copying executor name and password via the control panel 500 (Step S301).

Subsequently, based on data stored in the storage unit 300 (decoding key storage means), the CPU matches the copying executor name and password received in Step S301. When the copying executor name and password coincide with those stored in the storage unit 300, the CPU (decoding key reading section) reads, from the data stored in the storage unit 300 (decoding key storage means), a secret key (decoding key) associated with the copying executor name or password received in Step S301 (Step S302). However, the present invention is not limited to the foregoing steps, but the copying executor name and secret key may alternatively be received via the control panel 500. The read secret key is temporarily stored in the RAM of the control unit 100.

On the other hand, when the copying executor name and password do not coincide with those stored in the storage unit 300, the CPU displays, on the display section 501, a text indicating that the copying executor name and password do not coincide with those stored in the storage unit 300, and the input screen for recommending re-input of the copying executor name and password.

Next, the CPU provides an instruction to the image reading apparatus 200 to read image data of the copying-limited document, thereby obtaining the image data of the copying-limited document (Step S303). Then, the CPU provides an instruction to the QR code data obtaining section 416 to extract (separate) QR code data from the image data of the copying-limited document (Step S304). In response to the instruction from the CPU, the QR code data obtaining section 416 identifies the position of the QR code based on a cut-out symbol of the QR code to extract the QR code data from the image data of the copying-limited document, and the CPU obtains the document creator name (first data) based on the QR code data.

The CPU provides an instruction to the micro gradation data obtaining section 417 to extract (separate) micro gradation data from the image data of the copying-limited document (Step S305). In response to the instruction from the CPU, the micro gradation data obtaining section 417 extracts the micro gradation data from the image data of the copying-limited document, and the CPU obtains the micro gradation data (encrypted second data).

Subsequently, the CPU provides an instruction to the decoding section 418 to decode the micro gradation data (Step S306). In response to the instruction from the CPU, the decoding section 418 reads the secret key stored in the RAM of the control unit 100, and decodes the micro gradation data using the secret key.

Thereafter, the CPU determines whether or not the decoding has been successfully performed by the decoding section 418 (Step S307). When it is determined that the decoding has not been successfully performed by the decoding section 418 (Step S307: NO), i.e., when an attempt to copy the copying-limited document is made by a person who is not permitted to copy the copying-limited document by the document creator, the CPU displays, on the display section 501 of the control panel 500, a message indicating that copying is not allowed (Step S309), and then ends the process.

On the other hand, when it is determined that the decoding has been successfully performed by the decoding section 418 (Step S307: YES), the CPU (process permission section) permits copying to be executed by the copying executor concerning the copying executor name and password received in Step S301 (Step S308). The CPU provides an instruction to the image output apparatus 700 to copy the copying-limited document. In response to the instruction from the CPU, the image output apparatus 700 prints, on a recording sheet, an image that is based on the image data of the read copying-limited document.

As described above, the encryption is performed using the public key of the person who is permitted to copy, and therefore, the copying is allowed only when the decoding is performed using the secret key of the person who is permitted to copy. Since the image forming apparatus according to Embodiment 3 has the above-described configuration, the utilization (e.g., copying, editing and the like) of the created document (or image data of the document) can be managed.

Components similar to those of Embodiment 1 are identified by the same reference characters, and the detailed description thereof will be omitted.

Embodiment 4

Example 1

Figure 14:
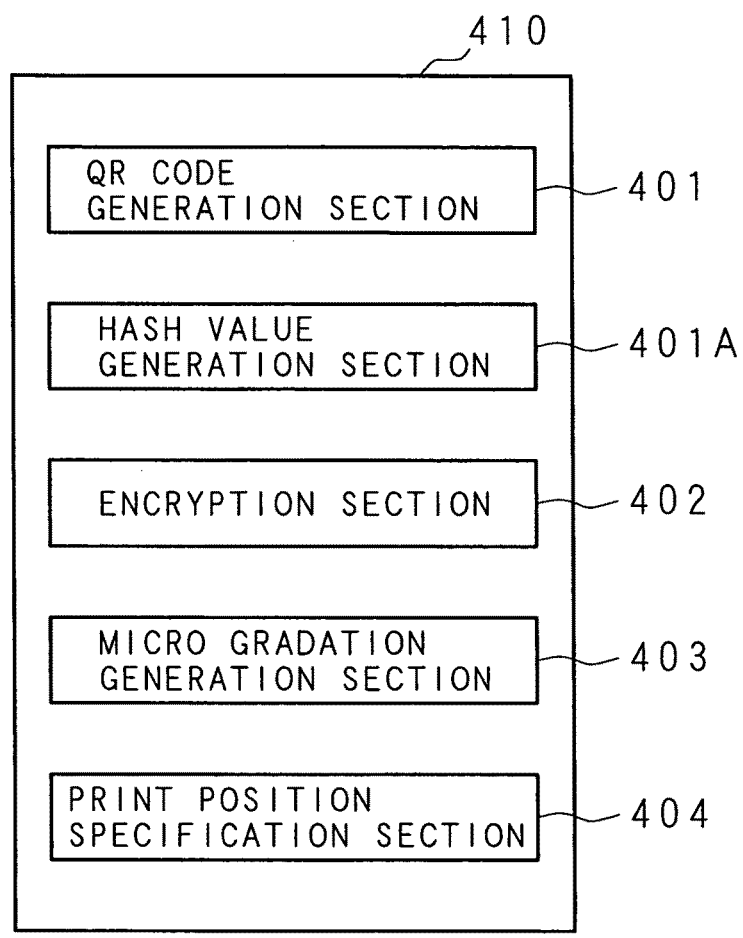
FIG. 14 is a block diagram illustrating principal components of a code creation section of an image forming apparatus according to Example 1 of Embodiment 4 of the present invention.

An image forming apparatus according to Example 1 of Embodiment 4 of the present invention has a configuration similar to that of the image forming apparatus according to Embodiment 1, but has a different code creation section 410. FIG. 14 is a block diagram illustrating principal components of the code creation section 410 of the image forming apparatus according to Example 1 of Embodiment 4.

The code creation section 410 of the image forming apparatus according to Example 1 of Embodiment 4 includes: a QR code generation section 401; an encryption section 402; a micro gradation generation section 403; and a print position specification section 404. The code creation section 410 of the image forming apparatus according to Example 1 of Embodiment 4 further includes a hash value generation section 401A.

For example, when the image reading apparatus 200 has read image data of a document and obtained the image data, the hash value generation section 401A applies a hash function to the image data, and determines a hash value of the image data of the document. The hash value determined in this manner is, for example, stored in the storage unit 300 or transmitted to an external device via the communication unit 600 (output means).

The hash value is also referred to as a "message digest", and is calculated in accordance with an algorithm described in "The MD5 Message-Digest Algorithm" (R. Rivest, MIT Laboratory for Computer Science and RSA Data Security, Inc), for example.

The general outlines of the MD5 algorithm will be described below.

1. A padding (extending) process is performed on document electronic data (image data), for example, so that it is congruent to 448 bits, modulo 512 (MD5 standard). For example, when the electronic data is 600 bits, the number of bits is extended to 960 bits (512+448=960). Specifically, 1 is added to the 601st bit, and 0 is added to the 602nd bit and the subsequent bits up to the 960th bit.

2. The bit length of the electric data is added as 64 bits to the above result. For example, since the electronic data is 600 bits, a value that represents 600(dec) in binary representation of 64 bits is added (dec denotes decimal).

3. Four 8-byte buffers are prepared and initialized. Specifically, the buffers are initialized in hexadecimal notation as follows: A=01234567(hex), B=89abcdef(hex), C=fedcba98 (hex), and D=76543210(hex) (hex denotes hexadecimal).

4. A table T[1 . . . 64] having 64 elements is defined as follows: supporting that T[i] is determined as the i-th element, the integer part of the product of 4294967296 (MD5 standard) abs[sin(i)] (absolute value of sine function). In this case, the unit of i is radian.

5. The following four functions are defined: F(X, Y, Z)= (XandY)or(not(X) and Z, G(X, Y, Z)=(XandZ)or Yand(not (Z)), H(X, Y, Z)=XxorYxorZ, and I(X, Y, Z)=Yxor(Xor(not (Z)).

6. For the data created in the foregoing step "2", the following steps are performed for every 16 words (in this case, 1 word is defined as 4 bytes).

(1). The data is stored in a table "X[j](0≤j≤15)" for every 4 bytes.

(2). The values of A, B, C and D are copied to AA, BB, CC and DD.

(3). Supposing that [abcd k s i] denotes a=b+((a+F(b, c, d)+X[k]+T[i])<<<s), the following arithmetic computations are performed. This equation indicates that for the result obtained by performing the arithmetic computation of the right side, a leftward shift is made by s bits (<<<s denotes a leftward shift by s bits), and the value obtained by the s-bit shift is replaced with a.

[ABCD 0 7 1] [DABC 1 12 2] [CDAB 2 17 3] [BCDA 3 22 4]

As a result of the above arithmetic computations, the respective values of A, B, C and D are determined, and the following arithmetic computations are performed using these values. Such arithmetic computations will be performed repeatedly (the values of A, B, C and D determined in the step (3) are used in the arithmetic computations performed in the step (4), and the values of A, B, C and D determined in the step (4) are used in the arithmetic computations performed in the step (5). Subsequent arithmetic computations are performed in the similar manner).

[ABCD 4 7 5] [DABC 5 12 6] [CDAB 6 17 7] [BCDA 7 22 8]

[ABCD 8 7 9] [DABC 9 12 10] [CDAB 10 17 11] [BCDA 11 22 12]

[ABCD 12 7 13] [DABC 13 12 14] [CDAB 14 17 15] [BCDA 15 22 16]

(4). Supposing that [abcd k s i] denotes a=b+((a+G(b, c, d)+X[k]+T[i])<<<s), the following arithmetic computations are performed.

[ABCD 1 5 17] [DABC 6 9 18] [CDAB 11 14 19] [BCDA 0 20 20]

[ABCD 5 5 21] [DABC 10 9 22] [CDAB 15 14 23] [BCDA 4 20 24]

[ABCD 9 5 25] [DABC 14 9 26] [CDAB 3 14 27] [BCDA 8 20 28]

[ABCD 13 5 29] [DABC 2 9 30] [CDAB 7 14 31] [BCDA 12 20 32]

(5). Supposing that [abcd k s i] denotes a=b+((a+H(b, c, d)+X[k]+T[i])<<<s), the following arithmetic computations are performed.

[ABCD 5 4 33] [DABC 8 11 34] [CDAB 11 16 35] [BCDA 14 23 36]

[ABCD 1 4 37] [DABC 4 11 38] [CDAB 7 16 39] [BCDA 10 23 40]

[ABCD 13 4 41] [DABC 0 11 42] [CDAB 3 16 43] [BCDA 6 23 44]

[ABCD 9 4 45] [DABC 12 11 46] [CDAB 15 16 47] [BCDA 2 23 48]

(6). Supposing that [abcd k s i] denotes a=b+((a+I(b, c, d)+X[k]+T[i])<<<s), the following arithmetic computations are performed.

[ABCD 0 6 49] [DABC 7 10 50] [CDAB 14 15 51] [BCDA 5 21 52]

[ABCD 12 6 53] [DABC 3 10 54] [CDAB 10 15 55] [BCDA 1 21 56]

[ABCD 8 6 57] [DABC 15 10 58] [CDAB 6 15 59] [BCDA 13 21 60]

[ABCD 4 6 61] [DABC 11 10 62] [CDAB 2 15 63] [BCDA 9 21 64]

(7). As a result of the above arithmetic computations, the values of A, B, C and D are determined. AA, BB, CC and DD, which have been copied in the step (2), are added to these values. Thus, the following equations hold true: A=A+AA, B=B+BB, C=C+CC, and D=D+DD (where "=" denotes substitution of the right side into the left side).

(8). If the foregoing steps on all pieces of data have been finished, the following step "7" will be performed. If the foregoing steps have not been finished yet, the process returns to the step (1) using new (next) 16 words.

7. The values of A, B, C and D, determined by performing the foregoing steps on the electronic data, are rearranged sequentially from the lower byte, and the rearranged values are determined as an MD (message digest).

Hereinafter, processing performed by the image forming apparatus according to Example 1 of Embodiment 4 of the present invention will be described in detail. For the sake of convenience of description, the description will be made, by way of example, about a case where the image forming apparatus according to Example 1 is connected to an external PC, image data is obtained from the PC, and an image based on the image data is printed on a recording medium (e.g., paper or the like).

When image data to be printed has been obtained from the PC, the image forming apparatus according to Example 1 receives a name of a creator of the image data via the control panel 500 similarly to the image forming apparatus according to Embodiment 1, and the QR code generation section 401 of the code creation section 410 generates image data of a QR code based on the received image data creator name. Next, the hash value generation section 401A applies a hash function to the obtained image data, and determines a hash value of the image data. The hash value determined by the hash value generation section 401A is, for example, transmitted to an external device via the communication unit 600. Further, the hash value determined by the hash value generation section 401A is encrypted by the encryption section 402 using a secret key concerning the creator name. Based on the encrypted hash value, the micro gradation generation section 403 generates image data of micro gradation presented in the cells of the QR code. Thus, image data of a gradation QR code is generated, the print position specification section 404 decides the position of the image data of the gradation QR code on a recording sheet on which printing should be performed, and the image output apparatus 700 prints, on the recording sheet, an image based on the image data to which the image data of the gradation QR code has been added.

On the other hand, the external device (e.g., a multi-function peripheral), which receives the hash value transmitted via the communication unit 600, stores the received hash value. When image data read from a given document is provided with a gradation QR code, the hash value is obtained from the gradation QR code, and said hash value is matched with the stored hash value, thereby making it possible to determine reliability of the given document.

Example 2

Figure 15:
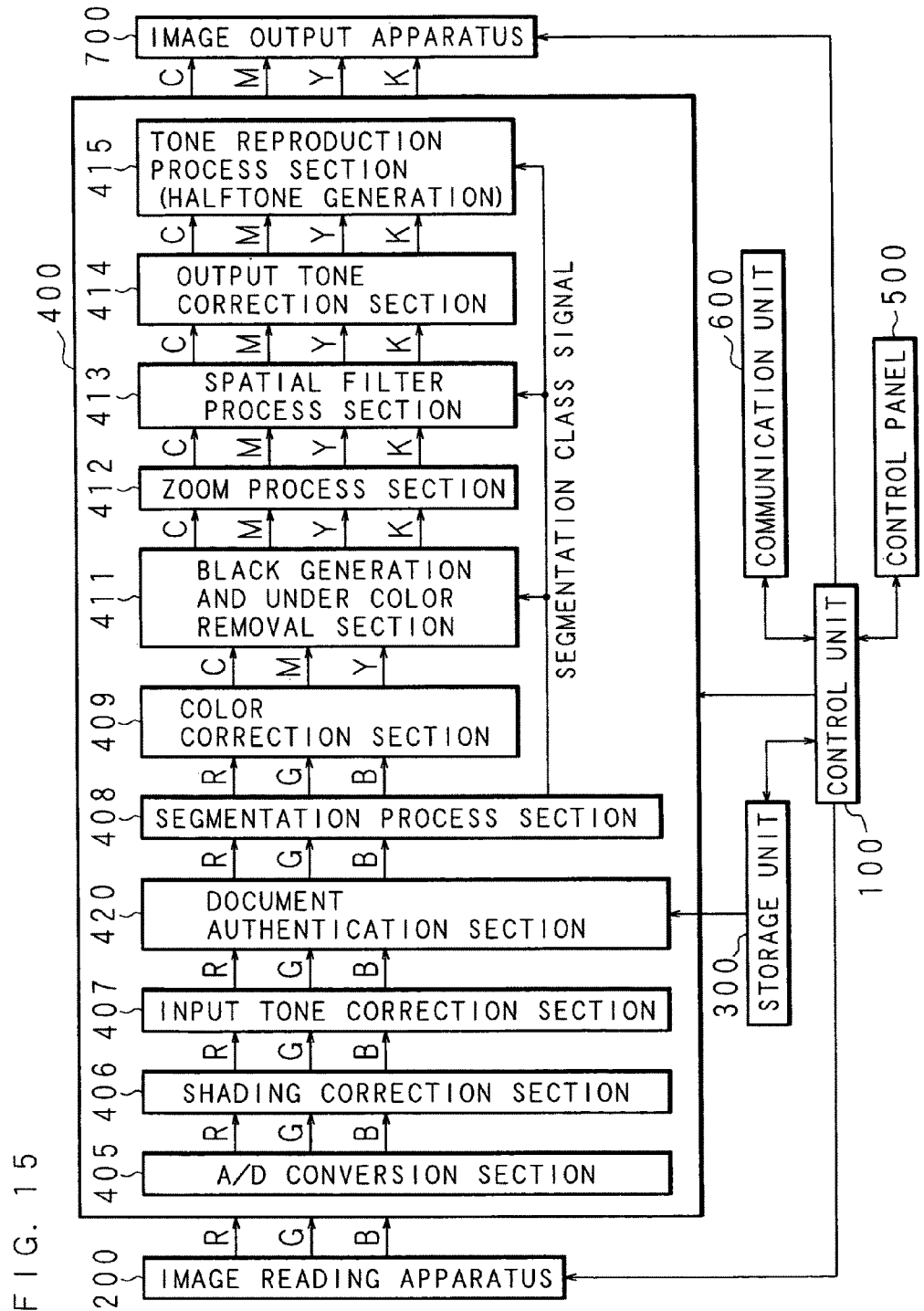
FIG. 15 is a block diagram illustrating principal components of an image forming apparatus according to Example 2 of Embodiment 4 of the present invention.
Figure 16:
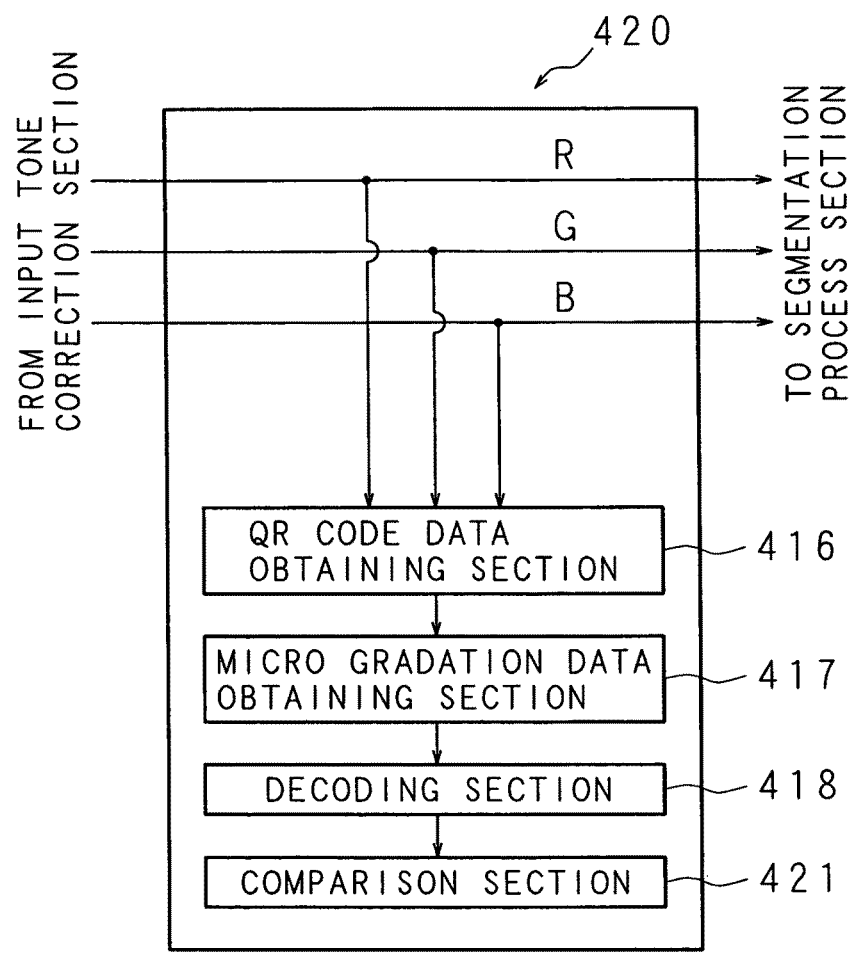
FIG. 16 is a block diagram illustrating principal components of a document authentication section of the image forming apparatus according to Example 2 of Embodiment 4 of the present invention.

FIG. 15 is a block diagram illustrating principal components of an image forming apparatus according to Example 2 of Embodiment 4 of the present invention, and FIG. 16 is a block diagram illustrating principal components of a document authentication section 420 of the image forming apparatus according to Example 2 of Embodiment 4 of the present invention.

Similarly to the image forming apparatus according to Embodiment 2, the image forming apparatus according to Example 2 of Embodiment 4 of the present invention includes hardware devices such as: a control unit 100; an image reading (input) apparatus 200; an image processing apparatus 400; an image output apparatus 700; a storage unit 300; a communication unit 600; and an control panel 500, and these hardware devices constitute a digital multi-function peripheral as a whole. Further, the image processing apparatus 400 includes the document authentication section 420. In the storage unit 300, user name, password for each user, user-specific secret key (and public key), etc. are stored in association with each other similarly to Embodiment 2, and a hash value is further stored in the storage unit 300. The hash value may be obtained on a voluntary basis, or may be received from outside as described in Example 1 of Embodiment 4.

The image processing apparatus 400 includes: an A/D conversion section 405; a shading correction section 406; an input tone correction section 407; the document authentication section 420; a segmentation process section 408; a color correction section 409; a black generation and under color removal section 411; a zoom process section 412; a spatial filter process section 413; an output tone correction section 414; and a tone reproduction process section 415. Furthermore, the image processing apparatus 400 is connected with the image reading apparatus 200 and the image output apparatus 700, and thus the image processing apparatus 400, the image reading apparatus 200 and the image output apparatus 700 constitute a digital multi-function peripheral as a whole.

Analog signals read by the image reading apparatus 200 are sent through the image processing apparatus 400 in the following order: the A/D conversion section 405; the shading correction section 406; the input tone correction section 407; the document authentication section 420; the segmentation process section 408; the color correction section 409; the black generation and under color removal section 411; the zoom process section 412; the spatial filter process section 413; the output tone correction section 414; and the tone reproduction process section 415. The signals are outputted as CMYK digital color signals to the image output apparatus 700.

Hereinafter, these operations will be described in detail by taking the case of using image data, to which a gradation QR code is added, as an example.

The A/D (analog/digital) conversion section 405 converts the RGB analog signals, which have been sent from the image reading apparatus 200, into digital signals, and the shading correction section 406 performs, on the digital RGB signals sent from the A/D conversion section 405, a process for removing various distortions caused in an illumination system, an image focusing system and/or an image sensing system of the image reading apparatus 200.

The input tone correction section 407 performs a process for adjusting color balance of the RGB signals (RGB reflectance signals), from which various distortions have been removed by the shading correction section 406, and for concurrently converting the RGB signals into density signals.

It should be noted that the document authentication section 420 of the image forming apparatus according to Embodiment 4 includes: a QR code data obtaining section 416; a micro gradation data obtaining section 417; a decoding section 418; and a comparison section 421.

The QR code data obtaining section 416 identifies, from a cut-out symbol of a QR code, the position of the QR code, and obtains (extracts) the QR code data from image data of a document sent from the image reading apparatus 200. Based on the identified QR code position, the micro gradation data obtaining section 417 obtains (extracts) micro gradation data from the image data of the document sent from the image reading apparatus 200. The decoding section 418 decodes the micro gradation data using, for example, a public key obtained based on a document creator name that is based on the QR code data.

Furthermore, the comparison section 421 reads a hash value stored in the storage unit 300, and compares said hash value with hash value obtained by the decoding performed by the decoding section 418. Based on the comparison result obtained by the comparison section 421, the CPU of the control unit 100 provides an instruction for continuing/interrupting subsequent processing, for example.

When the decoding of the micro gradation data has been successfully performed and the micro gradation data coincides with the QR code data, the document creator is authenticated in the comparison diction 421. For example, based on the authentication result, it is determined whether or not the processing should be continued or interrupted.

On the other hand, when a hash value is contained in the decoded data, the hash value is sent to the comparison section 421 together with the hash value stored in the storage unit 300. The comparison section 421 compares two hash values with each other, and determines whether or not an instruction (copying instruction), which has been received from a user, should be continued or interrupted depending on coincidence or not. For example, when it is determined that the received instruction (copying instruction) should be continued, the following processing will be performed.

The segmentation process section 408 segments, based on the RGB signals, respective pixels included in an input image into a text area, a halftone area, and a photograph area. Based on the segmentation result, the segmentation process section 408 outputs segmentation class signals, indicating which area the pixels belong to, to the black generation and under color removal section 411, the spatial filter process section 413 and the tone reproduction process section 415, and the segmentation process section 408 further outputs, to the color correction section 409 described later, input signals outputted from the input tone correction section 407 as they are.

In order to realize color reproduction with high fidelity, the color correction section 409 performs a process for removing color impurity based on spectral characteristics of CMY (C: cyan, M: magenta, and Y: yellow) color materials containing unnecessary absorption components.

The black generation and under color removal section 411 performs black generation for generating a black (K) signal from the CMY three-color signals that have been subjected to color correction, and performs a process for generating new CMY signals by subtracting, from the original CMY signals, the K signal obtained by the black generation, thus converting the CMY three-color signals into CMYK four-color signals.

As an example of the black generation process, there is a method (usual method) for performing black generation using skeleton black. In this method, supposing that input-output characteristic of skeleton curve is represented by y=f(x), inputted data is represented by C, M and Y, outputted data is represented by C', M', Y' and K', and an UCR (Under Color Removal) rate is represented by a(0≤α≤1), the black generation and under color removal process will be expressed by the following equations: K'=f{min(C, M, Y)}, C'=C−αK', M'=M−αK', and Y'=Y−αK'.

The zoom process section 412 performs a process such as image enlargement, reduction or the like based on a signal inputted through the control panel 500 included in the image forming apparatus.

Based on the segmentation class signals, the spatial filter process section 413 performs, using a digital filter, a spatial filter process on image data of the CMYK signals inputted from the zoom process section 412, so as to correct spatial frequency characteristic, thereby preventing blurriness and graininess degradation in an output image. Similarly to the spatial filter process section 413, the tone reproduction process section 415 also performs a predetermined process on the image data of the CMYK signals based on the segmentation class signals.

In particular, in order to improve the reproducibility of black text or color text, for example, with respect to an area segmented into the text area by the segmentation process section 408, a high frequency component thereof is enhanced by an edge enhancement process in the spatial filter process by the spatial filter process section 413. At the same time, in the tone reproduction process section 415, a binarization process or a multi-level process using a high-resolution screen suitable for reproducing the high frequency component is selected.

Further, with respect to an area segmented into the halftone area by the segmentation process section 408, a low-pass filter process for removing input halftone component is performed by the spatial filter process section 413.

Furthermore, an output tone correction process is performed by the output tone correction section 414 based on the output characteristics of a color image output apparatus, and then a tone reproduction process (halftone generation) for finally segmenting the image into pixels and enabling reproduction of respective tones thereof is performed by the tone reproduction process section 415. With respect to an area segmented into the photograph area by the segmentation process section 408, a binarization process or a multi-level process is performed using a screen suitable for tone reproducibility.

The image data, on which the above-described processes have been performed, is temporarily stored in the storage unit 300, and is read at predetermined timing and inputted to the image output apparatus 700. The image output apparatus 700 prints (forms) the image data on a recording medium (e.g., paper or the like). For example, the image output apparatus 700 may be a color image output apparatus or the like in which an electrophotography method and an ink jet method are used, but the present invention is not particularly limited to such an apparatus. It should be noted that the above-described processes are controlled by an unillustrated CPU (Central Processing Unit).

Figure 17:
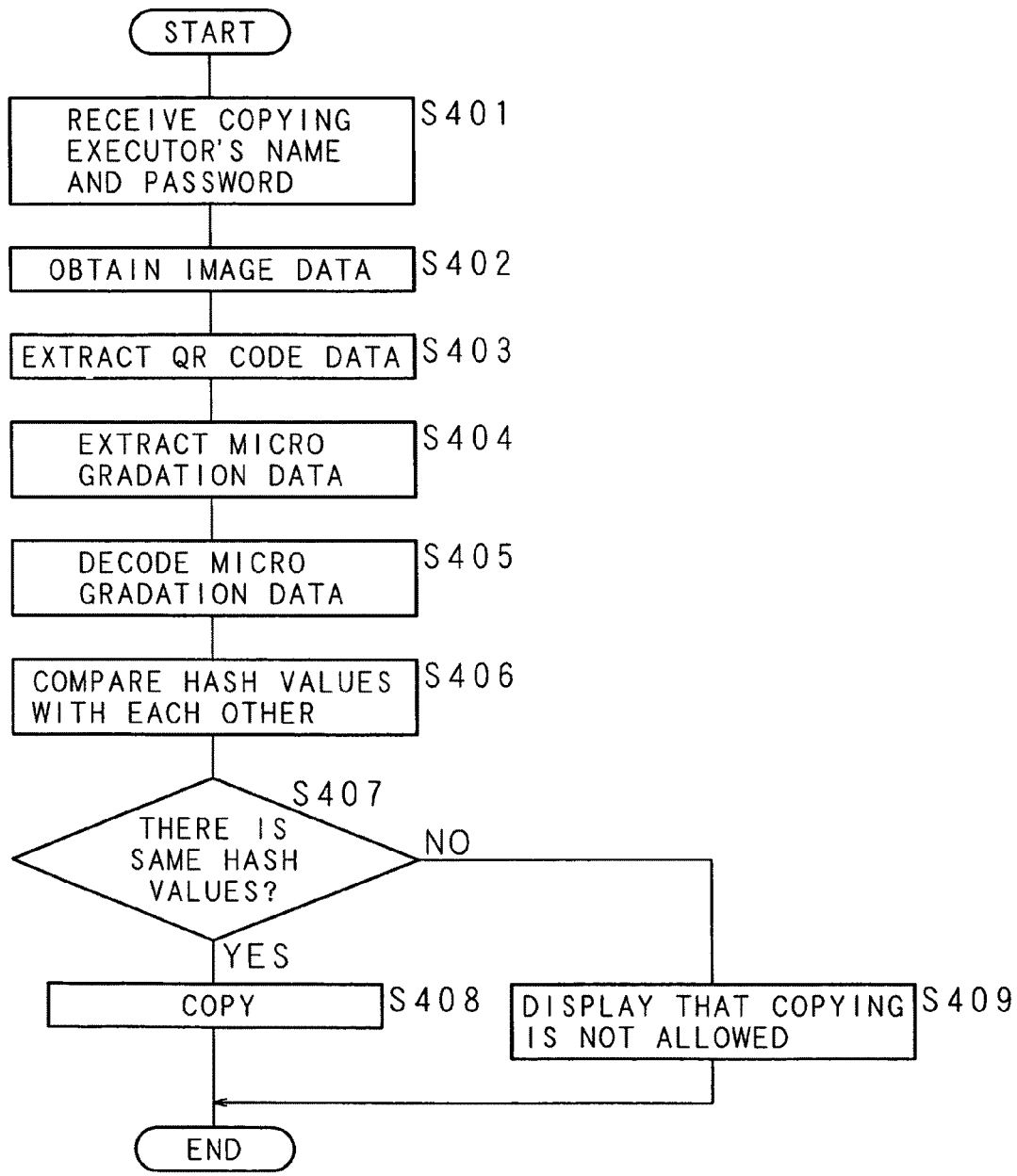
FIG. 17 is a flow chart illustrating processing performed by the image forming apparatus according to Example 2 of Embodiment 4 of the present invention on a document provided with a gradation QR code.

FIG. 17 is a flow chart illustrating processing by the image forming apparatus according to Example 2 of Embodiment 4 on a document provided with the gradation QR code. Hereinafter, for the sake of convenience of description, the description will be made, by way of example, about a case where a target document, in which micro gradation based on encrypted hash value is formed in cells of a QR code that is based on a creator name, is copied by a predetermined copying executor. It should be noted that in the storage unit 300 (decoding key storage means), user name, password for each user, and user-specific secret key (and public key) are stored in association with each other similarly to Embodiment 1, and a plurality of hash values obtained on a voluntary basis by the method described in Example 1 of Embodiment 4 are further stored in the storage unit 300.

Before copying the target document, the copying executor first inputs his or her name and password by operating the control panel 500. Thus, the CPU of the control unit 100 receives the copying executor name and password via the control panel 500 (Step S401).

Subsequently, based on data stored in the storage unit 300, the CPU matches the copying executor name and password received in Step S401. When the copying executor name and password coincide with those stored in the storage unit 300, the CPU reads, from the storage unit 300, a secret key associated with the copying executor name or password. However, the present invention is not limited to these steps, but the copying executor name and secret key may alternatively be received via the control panel 500. The obtained secret key is temporarily stored in the RAM of the control unit 100.

Next, the CPU provides an instruction to the image reading apparatus 200 to read image data of the target document, thus obtaining the image data of the target document (Step S402). Then, the CPU provides an instruction to the QR code data obtaining section 416 to extract QR code data from the image data of the target document (Step S403). In response to the instruction from the CPU, the QR code data obtaining section 416 identifies the position of the QR code based on a cut-out symbol of the QR code, and extracts the QR code data from the image data of the target document. Thus, based on the QR code data, the CPU can obtain the name of the creator of the target document.

The CPU provides an instruction to the micro gradation data obtaining section 417 to extract micro gradation data from the image data of the target document (Step S404). In response to the instruction from the CPU, the micro gradation data obtaining section 417 extracts the micro gradation data from the image data of the target document.

Subsequently, the CPU provides an instruction to the decoding section 418 to decode the micro gradation data (Step S405). In response to the instruction from the CPU, the decoding section 418 reads the secret key stored in the RAM of the control unit 100, and decodes the micro gradation data using the secret key. Thus, the hash value can be obtained. Hereinafter, the hash value decoded by the decoding section 418 will be referred to as an "obtained hash value".

Then, the CPU provides an instruction to the comparison section 421 of the document authentication section 420, thus matching the obtained hash value with the hash value stored in the storage unit 300 (Step S406). In response to the instruction from the CPU, the comparison section 421 matches so as to determine whether there is the stored hash value identical to the obtained hash value.

Based on a result of the comparison made by the comparison section 421, the CPU determines whether or not there is the stored hash value identical to the obtained hash value (Step S407). When it is determined that there is the stored hash value identical to the obtained hash value (Step S407: YES), the CPU instructs the image output apparatus 700 to copy the target document (Step S408).

On the other hand, when it is determined that there is not the stored hash value identical to the obtained hash value (Step S407: NO), the CPU displays, on the display section 501 of the control panel 500, a message indicating that copying is not allowed (Step S409), and then ends the process.

It should be noted that the present invention is not limited to the above-described process, but an alternative process may be employed as necessary so that copying is permitted when it is determined that there is not the stored hash value identical to the obtained hash value, and copying is not permitted when there is the stored hash value identical to the obtained hash value.

Further, an alternative process may be employed so that copying is permitted only when the document creator has added the hash value to the image data of the document, or only when the document creator has not added the hash value to the image data of the document.

In addition, when a printing system including a plurality of the image forming apparatuses according to Example 2 is provided, copying of a document printed outside the printing system may be limited by sharing the hash values, determined by the respective image forming apparatuses, in the printing system via a network, for example.

By using the hash value as micro gradation data as described in Example 2, the following effects can be obtained.

(1) When a file name is used, the problem of difficulty of document identification can be solved. (2) Even when documents are analogous, hash values thereof are totally different from each other, and therefore, it is also possible to cope with a difference between versions of the documents, for example. (3) As compared with a case where an entire document is targeted, a capacitive load on the storage means can be reduced.

In the above description, the case of copying a document has bee described by way of example, but the present invention is not limited to this case. For example, the present invention is also naturally applicable to a case where the image forming apparatus includes a facsimile transmission function, a "scan to e-mail" function, etc., and image data of the obtained document is transmitted/received to/from an external device.

For example, when a communication unit including a modem and a network card is provided and facsimile transmission is performed, a procedure for transmission to a destination is followed to ensure a transmittable state via the modem; then, document image data, compressed in a given format (e.g., image data read by a scanner), is subjected to a necessary process such as change in compression format, and is sequentially transmitted to the destination via a communication line.

Moreover, in the case of receiving image data, the CPU receives the image data transmitted from the destination to input the received image data to the image processing apparatus while following a communication procedure, and the image processing apparatus performs a decompression process on the received image data in an unillustrated compression/decompression process section. The decompressed image data is subjected to a rotation process and a resolution changing process as necessary, subjected to an output tone correction process and a tone reproduction process, and outputted from the image output apparatus.

Components similar to those of Embodiment 1 are identified by the same reference characters, and the detailed description thereof will be omitted.

Embodiment 5

Figure 18:
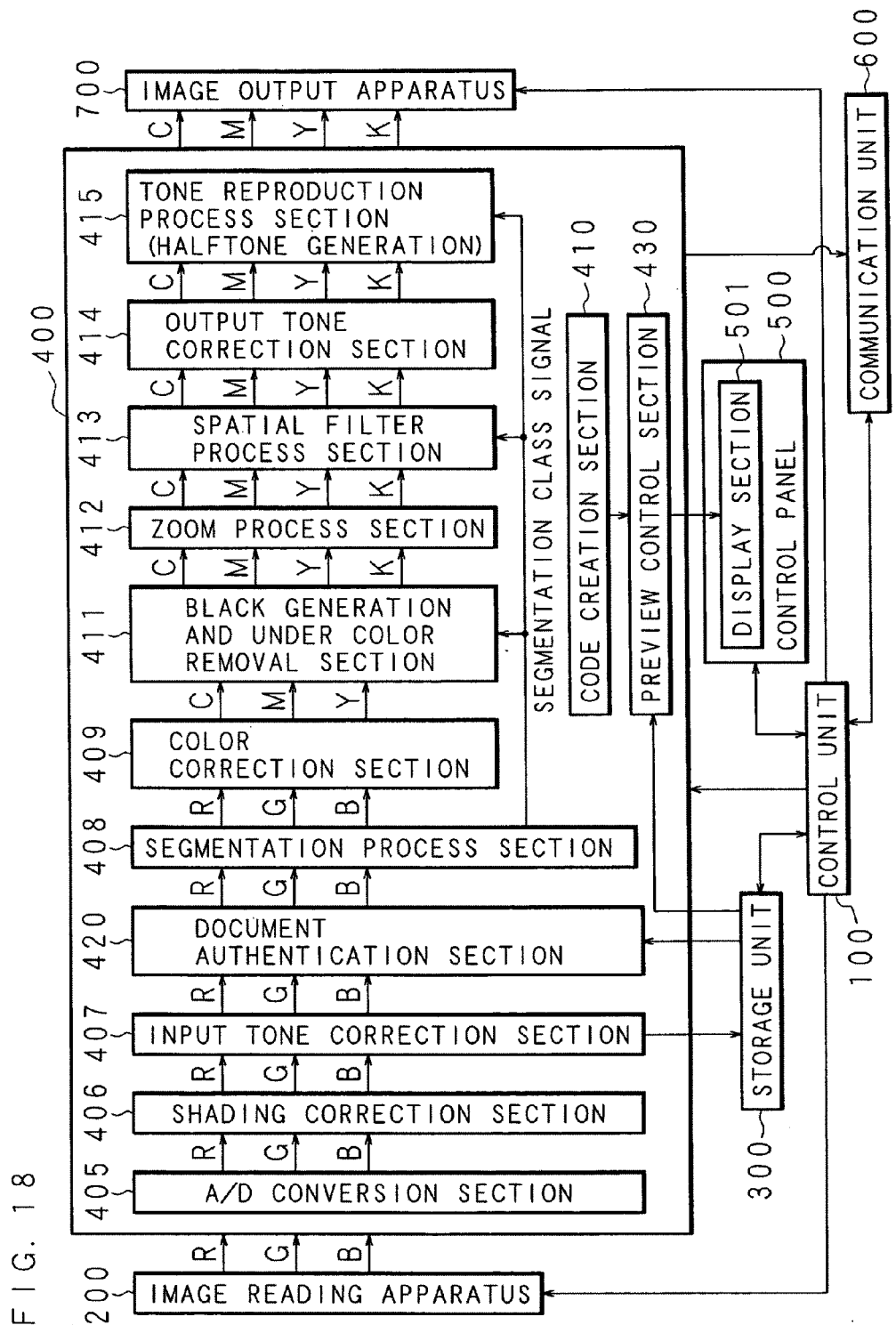
FIG. 18 is a block diagram illustrating principal components of an image forming apparatus according to Embodiment 5 of the present invention.

FIG. 18 is a block diagram illustrating principal components of an image forming apparatus according to Embodiment 5 of the present invention. Similarly to the image forming apparatus according to Embodiment 1, the image forming apparatus according to Embodiment 5 includes hardware devices such as: a control unit 100; an image reading apparatus 200; an image processing apparatus 400; an image output apparatus 700; a storage unit 300; a communication unit 600; and an control panel 500 having a display section 501, and these hardware devices constitute a digital multi-function peripheral as a whole.

The image processing apparatus 400 according to Embodiment 5 has a configuration substantially similar to that of the image processing apparatus 400 according to Embodiment 4, and includes: an A/D conversion section 405; a shading correction section 406; an input tone correction section 407; a document authentication section 420; a segmentation process section 408; a color correction section 409; a black generation and under color removal section 411; a zoom process section 412; a spatial filter process section 413; an output tone correction section 414; and a tone reproduction process section 415. Furthermore, the image processing apparatus 400 is connected with the image reading apparatus 200 and the image output apparatus 700. The image processing apparatus 400 further includes: a code creation section 410; and a preview control section 430 (preview section).

In order to decide the print position when image data of the gradation QR code is added to image data, the preview control section 430 of the image processing apparatus 400 displays, on the display section 501 of the control panel 500, a preview image indicative of a result obtained by recording an image based on the image data on a recording sheet. Moreover, on the display section 501, the preview control section 430 further displays, in a manner that is separated from the preview image concerning the image data, a preview image (additional preview image) that is based on the image data of the gradation QR code. Hereinafter, the preview image based on the image data of the gradation QR code will be abbreviated as a "code preview image".

Unlike the image forming apparatus according to Embodiment 1, the image forming apparatus according to Embodiment 5 is configured so that the position of the gradation QR code to be printed is decided by a user on a voluntary basis based on the preview image and code preview image displayed on the display section 501 by the preview control section 430.

Figure 19:
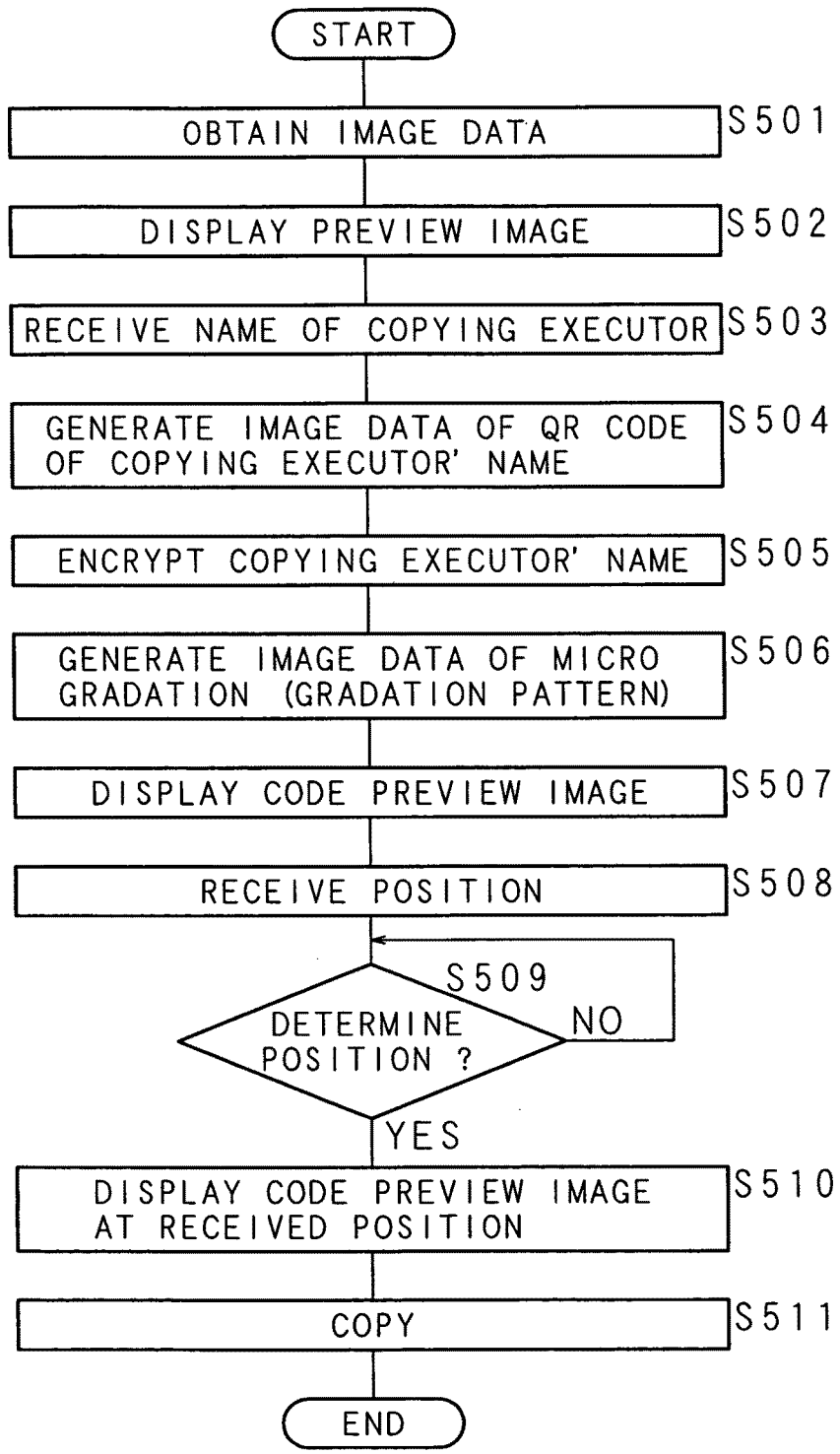
FIG. 19 is a flow chart illustrating processing by the image forming apparatus according to Embodiment 5 of the present invention for addition of a gradation QR code.

FIG. 19 is a flow chart illustrating processing by the image forming apparatus according to Embodiment 5 for addition of the gradation QR code. For the sake of convenience of description, the description will be made, by way of example, about a case where a given document, to which no gradation QR code is added, is copied, the image reading apparatus 200 reads image data of the given document, and the gradation QR code is added to the image data. It should be noted that user name, password for each user, and user-specific secret key (and public key) are stored in association with each other in the storage unit 300 (decoding key storage means) similarly to Embodiment 1.

In response to an instruction from the CPU of the control unit 100, the image reading apparatus 200 reads the image data of the given document to obtain the image data of the given document (Step S501). The read image data is sent to the image processing apparatus 400. The image data sent to the image processing apparatus 400 is subjected to process steps in the A/D conversion section 405, the shading correction section 406 and the input tone correction section 407, and is then stored in the storage unit 300.

Subsequently, the CPU provides an instruction to the preview control section 430, thus displaying, on the display section 501, the preview image (hereinafter called a "document preview image") that is based on the image data of the given document (Step S502).

The generation and display of the image data of the document preview image by the preview control section 430 will be described below.

The preview control section 430 reads the image data, which is stored in the storage unit 300 and on which an input tone correction process has been performed, and performs, for example, a process for downsampling pixels on the read image data so that the entire preview image is displayed on the display section 501. Examples of a method for downsampling pixels include the following interpolation methods. (1) Nearest neighbor: the value of an existing pixel, which is nearest to a pixel to be interpolated or having a predetermined positional relationship with a pixel to be interpolated, is defined as the value of the pixel to be interpolated. (2) Bilinear: an average of values, to which weights are assigned in proportion to the distances of existing pixels at four points surrounding a pixel to be interpolated, is determined, and the average value is defined as the pixel to be interpolated. (3) Bicubic: in addition to the values of pixels at four points surrounding a pixel to be interpolated, the values of pixels at twelve points further surrounding these four points (i.e., the values of pixels at sixteen points in total) are used to perform an interpolation operation.

Then, tone correction (gamma correction), which is based on the display characteristics of the display section 501, is performed on the image data that has been subjected to a downsampling process, and the resulting image data is outputted to the display section 501 so that the document preview image is displayed thereon. It should be noted that instead of displaying the document preview image based on the image data of the document read by the image reading apparatus 200 as described above, image data indicative of a given document preview image may be stored in advance in the storage unit 300 and the same document preview image may be always displayed.

Subsequently, a person who copies the given document (hereinafter called a "copying executor") inputs his or her name (which may alternatively be information, by which he or she can be identified, such as identification number etc.) by operating the control panel 500. The CPU receives the name of the copying executor via the control panel 500 (Step S503).

Based on the received copying executor name, the CPU generates image data of a QR code (Step S504). More specifically, the CPU provides an instruction to the QR code generation section 401 of the code creation section 410, and the QR code generation section 401 generates image data of a QR code based on the copying executor name.

Next, the CPU provides an instruction to the encryption section 402 to encrypt the copying executor name (Step S505). In response to the instruction from the CPU, the encryption section 402 encrypts, based on data stored in the storage unit 300, the copying executor name using a secret key concerning the copying executor name.

Then, the CPU provides an instruction to the micro gradation generation section 403 to generate image data of micro gradation (Step S506). In response to the instruction from the CPU, the micro gradation generation section 403 generates, based on the encrypted copying executor name, image data in which micro gradation including a plurality of areas having different densities is presented in cells of the QR code. As a result of the above-described steps, the image data of the gradation QR code is generated, and is temporarily stored in the RAM of the control unit 100.

The CPU provides an instruction to the preview control section 430, thus displaying the code preview image (additional preview image) on the display section 501 (Step S507). In accordance with the instruction from the CPU, the preview control section 430 generates, based on the image data of the gradation QR code, data of the code preview image, adjusts the size thereof so that the display magnification of the document preview image is achieved, and displays the code preview image on the display section 501.

Figure 20:
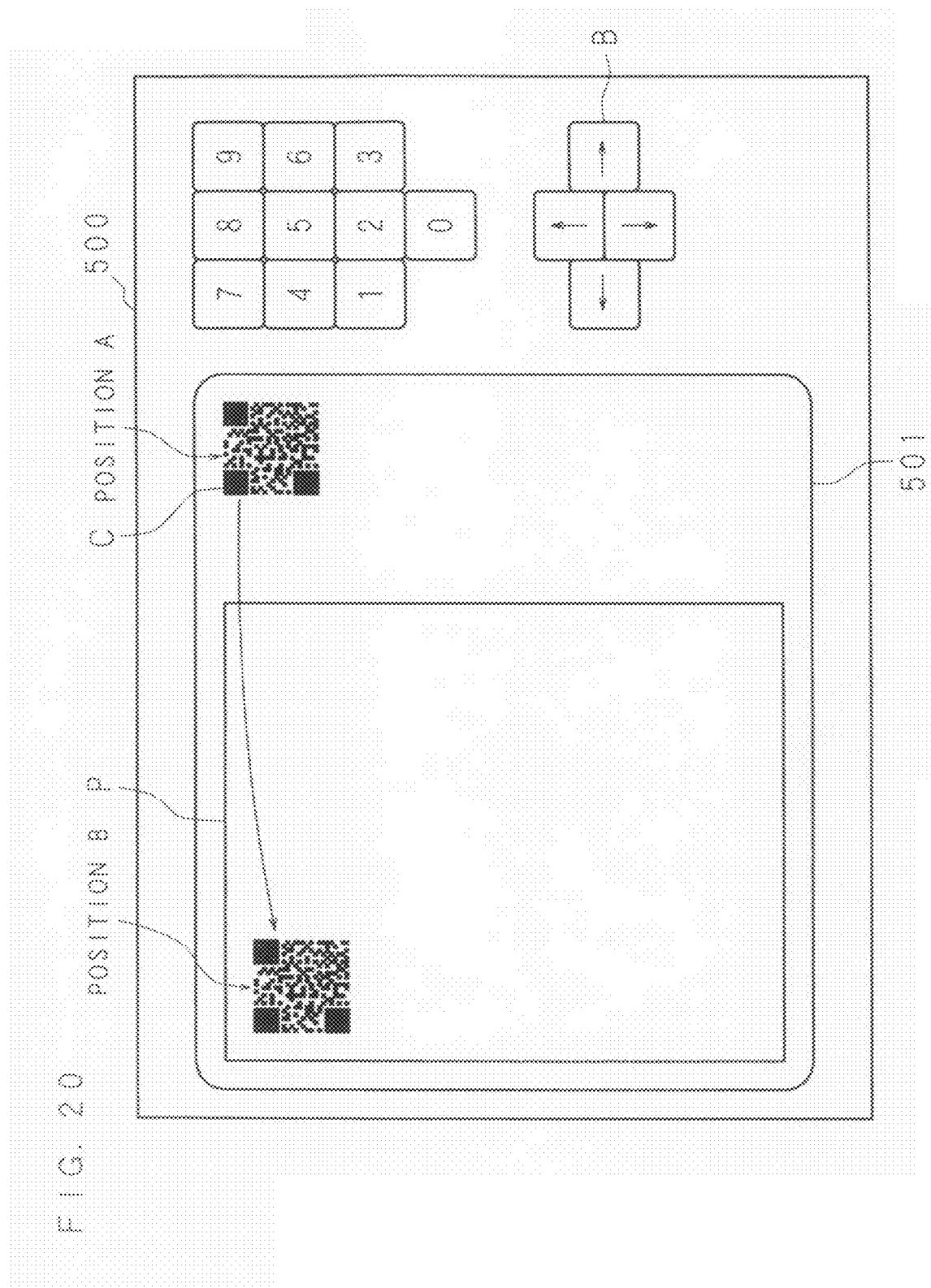
FIG. 20 is an explanatory diagram for describing the positioning of a code preview image in the image forming apparatus according to Embodiment 5 of the present invention.

Subsequently, the CPU receives the position of the code preview image on the document preview image via the control panel 500 (Step S508). FIG. 20 is an explanatory diagram for describing positioning of the code preview image. Operations concerning the positioning of the code preview image will be described in detail below.

The code preview image (C) is initially displayed at a position A of the display section 501, and the code preview image is active at the point. Then, the copying executor presses the cursor-movement key (B) of the control panel 500, thereby moving the code preview image to an arbitrary position (position B) located on the document preview image (P). The CPU receives data concerning the position of the code preview image via the control panel 500, and instructs the preview control section 430 to display the code preview image on the position concerning the received data.

It should be noted that the present invention is not limited to these operations, but the display section 501 of the control panel 500 may be provided with a touch panel so that the position of the code preview image may be received by pressing of a desired position by the copying executor with his or her fingertip, or the position of the code preview image may be received by dragging the code preview image to a desired position with the code preview image pressed.

Next, the CPU monitors the "enter" key of the control panel 500, thus determining whether or not the received code preview image position is accepted (Step S509). When it is determined that the display of the received code preview image is not accepted (Step S509: NO), i.e., when the "enter" key of the control panel 500 is not operated, the CPU waits until the "enter" key of the control panel 500 is operated.

On the other hand, when the "enter" key of the control panel 500 has been operated, the CPU determines that the received code preview image position is accepted (Step S509: YES), and provides an instruction to the preview control section 430, thus displaying the code preview image at the received code preview image position located on the document preview image (Step S510). In other words, image data, indicative of the code preview image, is generated and displayed at the received code preview image position, located on the document preview image, on the display section 501 by the preview control section 430.

Then, the CPU displays, for example, a text "Is it OK?" and "YES" and "NO" soft keys on the display section 501, and monitors an operation performed on the touch panel of the control panel 500, thus receiving confirmation of the copying executor and executing copying. In other words, the position accepted in Step S509 is determined as the print position, and the image data of the gradation QR code is added to the image data of the read given document based on data concerning the accepted position. As a result of the above-described steps, output image data is generated.

Subsequently, the CPU provides an instruction to the image output apparatus 700 to copy the given document (Step S511). In response to the instruction from the CPU, the image output apparatus 700 prints, on a recording sheet, an image that is based on the output image data. In this case, subsequent processing will be performed on the image data of the gradation QR code image on the assumption that the data is as follows: R=K, G=K, and B=K.

Components similar to those of Embodiment 1, Embodiment 2 and Embodiment 4 are identified by the same reference characters, and the detailed description thereof will be omitted.

Embodiment 6

An Image Forming Apparatus According to Embodiment 6 of the present invention has a configuration substantially similar to that of the image forming apparatus according to Embodiment 5, but further includes the following functions in addition to the functions of the image forming apparatus according to Embodiment 5.

The image forming apparatus according to Embodiment 6 of the present invention includes: a facsimile transmission/reception function; an image transmission function such as a "scan to e-mail" function for transmitting an e-mail, to which given data is attached, to a specified address, a "scan to ftp" function for transmitting data to a folder specified by a user, or a "scan to USB" function for transmitting data to a USB memory or the like provided in the image forming apparatus; and a function for displaying, on the display section 501, an image that is based on given image data.

In the image forming apparatus according to Embodiment 6 of the present invention, the image reading apparatus 200 reads image data of a given document, and the read image data is sent to the image processing apparatus 400. The image processing apparatus 400 appropriately processes the image data, thereby obtaining output image data in which image data of a gradation QR code is added to the image data of the given document. The obtained output image data is printed on a recording medium by the image output apparatus 700 as described in Embodiments 1 to 5, or outputted in accordance with the foregoing functions.

For example, the obtained output image data may be faxed to an external device via the communication unit 600, or may be attached to an e-mail and transmitted to a specified address. Furthermore, an image based on the obtained output image data may be displayed on the display section 501.

In the above description, as an example of a two-dimensional code, a QR code serving as a matrix type two-dimensional code has been described by way of illustration; however, the present invention is not limited to this code, but a stack type two-dimensional code may alternatively be used.

Embodiment 7

Figure 21:
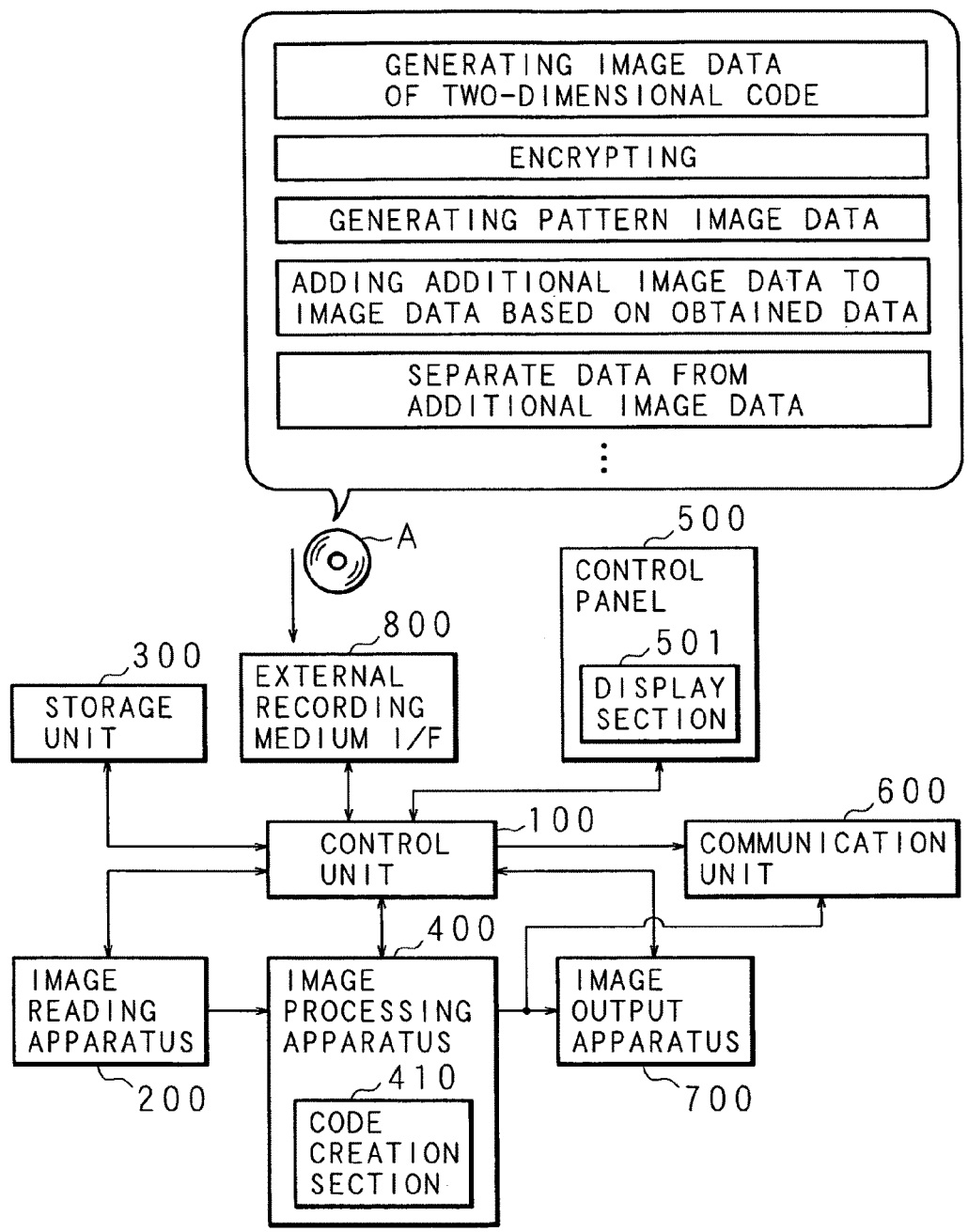
FIG. 21 is a block diagram illustrating principal components of an image forming apparatus according to Embodiment 7 of the present invention.

FIG. 21 is a block diagram illustrating principal components of an image forming apparatus according to Embodiment 7 of the present invention. The image forming apparatus according to Embodiment 7 is configured so that a program for performing an operation can also be provided via a portable recording medium A such as a CD-ROM through an external recording medium I/F 800. Moreover, the image forming apparatus according to Embodiment 7 is configured so that the computer program can also be downloaded via the communication unit 600 from an unillustrated external device. The details of these features will be described below.

The image forming apparatus according to Embodiment 7 includes an exterior (or interior) recording medium reading device (not illustrated). The portable recording medium A recording a program and the like is inserted into the recording medium reading device, and this program is installed on the storage unit 300, for example. This program causes the image forming apparatus to: generate, based on first data concerning security of obtained data, image data indicative of a two-dimensional code having a plurality of cells; encrypt second data concerning security of the obtained data; generate, based on the encrypted second data, a pattern image data in which micro gradation (gradation pattern) is presented in the cells of the two-dimensional code; add additional image data which is based on the image data of the two-dimensional code and the pattern image data, to the image data; separate (extract) the first data and the second data from the additional image data; and match the first data with the second data. Such a program is loaded into the RAM of the control unit 100 so as to be executed. Thus, the image forming apparatus according to Embodiment 7 functions as any of the image forming apparatuses according to Embodiments 1 to 6 of the present invention.

The recording medium may be an unillustrated memory, e.g., a ROM, which itself serves as program media so as to execute processes by a microcomputer, or may be a medium carrying a program code in a fixed manner, examples of which includes: tape systems such as a magnetic tape and a cassette tape; disk systems including magnetic disks such as a flexible disk and a hard disk, and optical disks such as a CD-ROM, an MO, an MD and a DVD; card systems such as an IC card (including a memory card) and an optical card; and semiconductor memories such as a mask ROM, an EPROM, an EEPROM and a flash ROM.

The recording medium may alternatively be a medium carrying a program code in an unfixed manner so that the program code is downloaded from a communication network via the communication unit 600. It should be noted that when a program is downloaded from a communication network in this manner, the download program may be stored in advance in a main apparatus, or may be installed thereon from another recording medium. It should also be noted that the present invention may also be realized in a form of a computer data signal embedded in a carrier wave, in which the program code is embodied by electronic transmission.

Components similar to those of Embodiment 1 are identified by the same reference characters, and the detailed description thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image generating apparatus for generating image data based on obtained data, comprising:
  a code generation section for generating, based on first data concerning security of the obtained data, image data indicative of a two-dimensional code having a plurality of cells;
  an encryption section for encrypting second data concerning security of the obtained data;
  a pattern generating section for generating, based on the encrypted second data, pattern image data in which a gradation pattern is presented in the cells of the two-dimensional code; and
  an addition section for adding, to the image data, additional image data which is based on the generated image data of the two-dimensional code and the generated pattern image data.

2. The image generating apparatus according to claim 1, further comprising a hash value generation section for applying a hash function to the image data, thereby generating a hash value of the image data,
   wherein the encryption section encrypts the hash value, and the pattern generation section generates pattern image data in which the generation pattern is presented, based on the encrypted hash value.

3. An image processing apparatus comprising:
   an obtaining section for obtaining the image data which is generated by the image generating apparatus according to claim 1 and to which the additional image data is added; and
   a separation section for separating the first data and the second data from the additional data of the obtained image data.

4. The image processing apparatus according to claim 3, further comprising a matching section for matching the first data with the second data, the first and second data being separated by the separation section.

5. The image processing apparatus according to claim 4, further comprising a reception section for receiving identification data for identifying a user,
   wherein the matching section matches the first data with the second data, based on the identification data received by the reception section.

6. The image processing apparatus according to claim 5, further comprising:
   a decoding key storage section for storing a decoding key for decoding the encrypted second data, in association with the identification data;
   a decoding key reading section for reading the decoding key from the decoding key storage section, based on the identification data received by the reception section; and
   a decoding section for decoding the encrypted second data using the decoding key read by the decoding key reading section,
   wherein the matching section matches the decoded data decoded by the decoding section, with the first data.

7. The image processing apparatus according to claim 5, further comprising:
   a decoding key storage section for storing a decoding key for decoding the encrypted second data, in association with the identification data;
   a decoding key reading section for reading the decoding key from the decoding key storage section, based on the identification data received by the reception section;
   a decoding section for decoding the encrypted second data using the decoding key read by the decoding key reading section; and
   a process permission section for permitting, when decoding has been successfully performed, a process concerning the image data to which the additional data has been added.

8. The image processing apparatus according to claim 4, further comprising a storing section for storing a hash value,
   wherein when the hash value is contained in the second data separated by the separation section, the matching section matches the hash value of the second data with the hash value stored in the storage section.

9. An image forming apparatus comprising the image generating apparatus according to claim 1,
   wherein the image generating apparatus generates image data to which the additional image data is added, and the image forming apparatus forms, on a sheet, an image that is based on the image data.

10. The image forming apparatus according to claim 9, further comprising:
    a display section; and
    a preview section for displaying, on the display section, a preview image indicative of a result of the formation of the image data on the sheet, and an additional preview image concerning the additional image data, and for further displaying the additional preview image at a given position located on the preview image.

11. An image forming apparatus comprising the image processing apparatus according to claim 4,
    wherein the image data to which the additional image data is added has been obtained, the image forming apparatus forms, on a sheet, an image based on the obtained image data, on the basis of a result of the matching by the matching section of the image processing apparatus.

12. The image forming apparatus according to claim 11, further comprising a display section,
    wherein data concerning a result of the matching by the matching section is displayed on the display screen.

13. A nontransitory recording medium readable by a computer and recording a computer program for causing a computer to generate image data based on obtained data, the computer program comprising:
    a code generating step of causing the computer to generate, based on first data concerning security of the obtained data, image data indicative of a two-dimensional code having a plurality of cells;
    an encryption step of causing the computer to encrypt second data concerning security of the obtained data;
    a pattern generation step of causing the computer to generate, based on the encrypted second data, pattern image data in which a gradation pattern is presented in the cells of the two-dimensional code; and
    an addition step of causing the computer to add, to the image data, additional image data which is based on the image data of the two-dimensional code and the pattern image data.

14. A nontransitory recording medium readable by a computer and recording a program, the computer program comprising:
    an obtaining step of causing a computer to obtain the image data which is generated by the computer program according to claim 13 and to which the additional image data is added;
    a separation step of causing the computer to separate the first data and the second data from the additional image data; and
    a matching step of causing the computer to match the first data with the second data, the first data and the second data being separated in the separation step.

15. The nontransitory recording medium according to claim 14, wherein the computer program further comprises:
    a reception step of causing the computer to receive identification data for identifying a user; and
    a step of causing the computer to match the first data with the second data, based on the identification data.

* * * * *